United States Patent
Song et al.

(10) Patent No.: US 9,602,180 B2
(45) Date of Patent: Mar. 21, 2017

(54) METHOD FOR DETERMINING A CODEBOOK, INFORMATION FEEDBACK METHOD AND DEVICES THEREOF

(71) Applicant: FUJITSU LIMITED, Kawasaki-shi, Kanagawa (JP)

(72) Inventors: Lei Song, Beijing (CN); Yi Zhang, Beijing (CN); Chenxi Zhu, Beijing (CN); Hua Zhou, Beijing (CN); Jian Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/837,421

(22) Filed: Aug. 27, 2015

(65) Prior Publication Data

US 2015/0372731 A1 Dec. 24, 2015

Related U.S. Application Data

(63) Continuation of application No. PCT/CN2013/072373, filed on Mar. 8, 2013.

(51) Int. Cl.
*H04B 7/04* (2006.01)
*H04B 7/06* (2006.01)

(52) U.S. Cl.
CPC ......... *H04B 7/0469* (2013.01); *H04B 7/0478* (2013.01); *H04B 7/0634* (2013.01); *H04B 7/0639* (2013.01)

(58) Field of Classification Search
CPC .. H04B 7/0469; H04B 7/0478; H04B 7/0634; H04B 7/0639
See application file for complete search history.

(56) References Cited

U.S. PATENT DOCUMENTS

| | | | |
|---|---|---|---|
| 2012/0082248 A1* | 4/2012 | Han | H04B 7/0413 375/259 |
| 2013/0223549 A1* | 8/2013 | Tong | H04B 7/0478 375/260 |
| 2014/0226702 A1* | 8/2014 | Onggosanusi | H04B 7/0469 375/219 |

FOREIGN PATENT DOCUMENTS

| | | |
|---|---|---|
| CN | 101969366 A | 2/2011 |
| CN | 102412939 A | 4/2012 |

(Continued)

OTHER PUBLICATIONS

Written Opinion of the International Searching Authority for corresponding International Patent Application No. PCT/CN2013/072373 mailed on Dec. 12, 2013, with English translation.

(Continued)

*Primary Examiner* — Ross Varndell
(74) *Attorney, Agent, or Firm* — Myers Wolin, LLC

(57) ABSTRACT

A method for determining a codebook, information feedback method and devices thereof. For precoding of a differential dual codebook, the method includes: providing N1 codewords in a second codebook, so that complex codewords obtained by a product of codewords in the second codebook and a first codebook satisfy corresponding antenna configuration(s), where N1 is greater than or equal to 16. Or for precoding of a GoB dual codebook, the method includes: codewords in a first codebook being:

$$W_1 = \begin{pmatrix} X & 0 \\ 0 & Y \end{pmatrix} = \begin{pmatrix} X & 0 \\ 0 & D_1 X D_2 \end{pmatrix};$$

where, $D_1$ and $D_2$ are respectively unitary diagonal matrixes for respectively weighting elements at each row and each (Continued)

column of a matrix X, X containing $N_b$ column vectors, and $N_b$ denotes the number of beams contained in the codewords of the first codebook. The embodiments of the present disclosure are applicable to various antenna configuration.

13 Claims, 4 Drawing Sheets

(56) References Cited

FOREIGN PATENT DOCUMENTS

| | | | | |
|---|---|---|---|---|
| CN | 102447523 A | | 5/2012 | |
| CN | 102571301 A | | 7/2012 | |
| CN | 101969366 B | * | 11/2012 | ............... H04L 1/06 |
| WO | 2012/043202 A1 | | 4/2012 | |
| WO | 2012/046988 A2 | | 4/2012 | |
| WO | 2012/058825 A1 | | 5/2012 | |

OTHER PUBLICATIONS

International Search Report issued for corresponding International Patent Application No. PCT/CN2013/072373, mailed Dec. 12, 2013, with an English translation.
Notice of Preliminary Rejection issued by the Korean Intellectual Property Office for corresponding Korean Application No. 10-2015-7026651 issued on Aug. 18, 2016, with an English translation.
Partial supplementary European search report issued for counterpart European patent application No. 13877239.7, issued on Oct. 19, 2016.
Qualcomm Inc, "Codebook system evaluations for 4Tx", Agenda Item: 6.3.3, 3GPP TSG-RAN WG1 Meeting #62, R1-104799, Madrid, Spain; Aug. 23-27, 2010.
Nokia et al., "Double codebook design principles", Agenda Item: 6.3.4, 3GPP TSG-RAN WG1 Meeting #61bis, R1-103804, Dresden, Germany; Jun. 28-Jul. 2, 2010.
Samsung, "Discussions on CSI feedback enhancement for homogeneous macro network", Agenda Item: 7.5.2, 3GPP TSG-RAN WG1 Meeting #66bis, R1-113584, Zhuhai, China; Oct. 10-14, 2011.
First Office Action issued by the Japan Patent Office for corresponding Japanese Patent Application No. 2015-560515, mailed on Jan. 4, 2017, with an English translation.
Samsung, "Performance evaluations of Rel. 10 4Tx feedback enhancement", Agenda Item: 6.3.3., 3GPP TSG-RAN WG1 Meeting #62, R1-105049, Madrid, Spain, Aug. 23-27, 2010.
Notice of Preliminary Rejection Issued by the Korean Intellectual Property Office for corresponding Korean Patent Application No. 10-2015-7026651, mailed on Jan. 18, 2017, with English translation.
Extended European search report with supplementary European search report and the European search opinion issued by the European Patent Office for corresponding European Patent Application No. 13877239.7, mailed on Jan. 31, 2017.
LG Electronics, "Feedback Codebook Enhancement and Performance Evaluation", Agenda Item: 6.3.3, 3GPP TSGRAN WG1 Meeting #62, R1-104768, Madrid, Spain, Aug. 23-28, 2010.
Texas Instruments, "Dual-Stage Codebook Proposal for Rel. 10 DL MIMO", Agenda Item: 6.3.3, 3GPP TSGRAN WG1 Meeting #62, R1-104471, Madrid, Spain, Aug. 23-28, 2010.

* cited by examiner

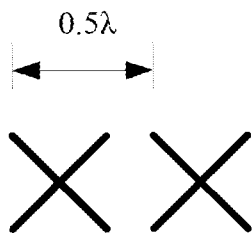
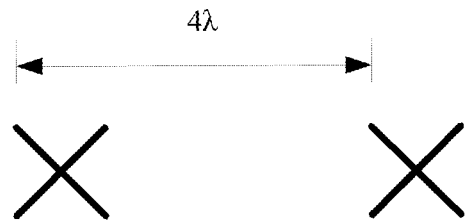
Fig. 1A
Fig. 1B
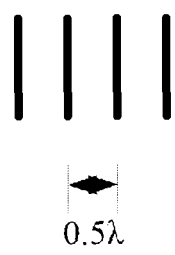
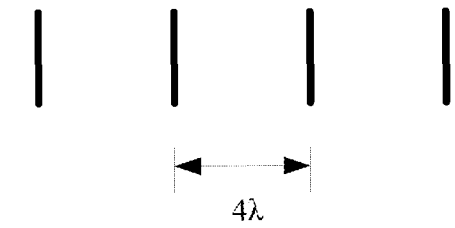
Fig. 1C
Fig. 1D

METHOD FOR DETERMINING A CODEBOOK, INFORMATION FEEDBACK METHOD AND DEVICES THEREOF

CROSS REFERENCE TO RELATED APPLICATIONS

This application is a continuation application of International Application PCT/CN2013/072373 filed on Mar. 8, 2013, the entire contents of which are incorporated herein by reference.

TECHNICAL FIELD

The present disclosure relates to the field of communications, and in particular to a method for determining a codebook, information feedback method and devices thereof.

BACKGROUND

Multiple input multiple output (MIMO) technology is one of important physical layer technologies for a long-term evolution/long-term evolution advanced (LTE/LTE-A) system, which is used for providing spatial diversity gains, spatial multiplexing gains and array gains.

When a base station and a mobile station are configured with multiple antennas, a multi-antenna transmission scheme may be properly selected according to such situations as traffic demands, channel states and particular antenna configurations, so as to improve the performance of the system. In the study of LTE-A downlink MIMO enhancement technology, three scenarios are defined, which are a macro cell scenario, indoor and/or outdoor low-power node scenario, and a small cell scenario of outdoor centralized configured antennas, respectively.

In the first scenario, i.e. the macro cell scenario, a base station end supports three types of antenna configurations, 2 antennas, 4 antennas, and 8 antennas, and the antenna configurations with 2 antennas and 4 antennas has a higher priority than the antenna configuration with 8 antennas. In the second and third scenarios, low-power nodes may be configured with 1 antenna (which is inapplicable to the third scenario), 2 antennas and 4 antennas, and the antenna configuration with 4 antennas has a higher priority than the antenna configurations with 1 antenna and 2 antennas. It can be seen therefrom that the antenna configuration with 4 antennas is important configuration in the study of LTE-A multi-antenna technology. In the above three scenarios, the 4 transmission antennas at the transmission end support four types of particular configuration, as shown in FIGS. 1A to 1D.

FIGS. 1A to 1D are schematic diagrams of antenna configurations in an antenna system. Wherein, FIG. 1A shows cross-polarized antennas with an antenna spacing of 0.5 times wavelength ($\lambda$), FIG. 1B shows cross-polarized antennas with an antenna spacing of 4$\lambda$, FIG. 1C shows co-polarized antennas with an antenna spacing of 0.5$\lambda$, and FIG. 1D shows co-polarized antennas with an antenna spacing of 4$\lambda$. And wherein, FIGS. 1C and 1D show horizontally co-polarized antenna configurations in co-polarized antenna configuration, and furthermore, the co-polarized antenna configuration may further include configurations with antennas that are vertically placed or placed at angles of ±45°.

In the study of LTE-A Release 12, the feedback enhancement technology based on codebooks in 4-antenna configuration is one of the focuses. The object of the study is to realize 4-antenna precoding matrix index (PMI) feedback codebook enhancement, so as to provide finer spatial domain granularities and to support different antenna configurations in macro cell and small cell scenarios, especially small and large spacing cross-polarized antennas, and co-polarized distributed antenna configuration of imbalanced power.

Due to different antenna configurations, needed optimal precoding matrices are also different. Wherein, precoding codewords applicable to co-polarized antennas (i.e., uniform linear array, ULA) with a spacing of 0.5$\lambda$ have the following structures respectively:

$$v_{ULA}(\theta) = \begin{bmatrix} 1 \\ e^{j\theta} \\ e^{j2\theta} \\ e^{j3\theta} \end{bmatrix}; \quad (1)$$

precoding codewords applicable to cross-polarized antennas (XPOL) with a spacing of 0.5$\lambda$ have the following structures respectively:

$$v_{XPOL}(\theta, \alpha) = \begin{bmatrix} 1 \\ e^{j\theta} \\ \alpha \\ \alpha e^{j\theta} \end{bmatrix}; \quad (2)$$

and precoding codewords applicable to antennas with a spacing of 4$\lambda$ (including co-polarization and cross polarization) have the following structures respectively:

$$v_{UNCORR}(\theta_1, \theta_2, \alpha) = \begin{bmatrix} 1 \\ e^{j\theta_1} \\ \alpha \\ \alpha e^{j\theta_2} \end{bmatrix}. \quad (3)$$

In the structure in above (1) to (3), $\theta$ denotes a phase, $\theta_1$, $\theta_2$ being uniformly quantized between [0, 2$\pi$), and $\alpha \in \{1, -1, j, -j\}$, denoting a phase weighting factor.

In the protocols of Release 10 and the earlier, 4-antenna MIMO employs a single codebook structure, as shown in FIG. 1. Wherein, $u_i$($i$=0, 1, ..., 15) are base vectors, and $W_i$ is a matrix generated by performing Householder transformation on $u_i$, all precoding matrices (i.e. codewords) with ranks 1-4 being able to be obtained from related columns of $W_i$. When the rank of the system is 1, codewords numbered 0-7 may be expressed as $$\begin{bmatrix} 1 & e^{\frac{j2\pi \cdot 1 \cdot m}{8}} & e^{\frac{j2\pi \cdot 2 \cdot m}{8}} & e^{\frac{j2\pi \cdot 3 \cdot m}{8}} \end{bmatrix}^T,$$

values of m being 0, 2, 4, 6, 1, 3, 5, 7, respectively, that is, the former 8 codewords may be applicable to a scenario of co-polarized antennas with a spacing of 0.5$\lambda$, and codewords numbered 0-11 may be expressed as $$\begin{bmatrix} 1 & e^{\frac{j2\pi m}{8}} & \alpha & \alpha e^{\frac{j2\pi m}{8}} \end{bmatrix}^T,$$

that is, they are applicable to a scenario of cross-polarized antennas with a spacing of 0.5λ, where, $$\theta = \frac{2\pi m}{8};$$

$\alpha \in \{1, -1, j, -j\}$. Furthermore, as a minimum chordal distance between 16 codewords in a codebook is 0.707, better performance may be obtained in uncorrelated channels. In summary, the 4-antenna codebook in Release 10 is applicable to all the four antenna configurations shown in FIGS. 1A-1D. However, as the number of the codewords is relatively small (which is only 16), division of spatial domain granularity in various antenna configurations is insufficiently fine.

TABLE 1

4-antenna Codebook in Release 10 Codebook for transmission on antenna ports {0, 1, 2, 3} and for CSI reporting based on antenna ports {0, 1, 2, 3} or {15, 16, 17, 18}.

| Codebook index | $u_n$ | Number of layers υ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

A dual codebook is a relatively new type of precoding structure over the single codebook structure employed by the 4-antenna systems in Release 10. There exist two codebooks in the dual codebook system, one is used for long-term and/or wideband feedback, and the other is used for short-term and/or instantaneous subband feedback. Complex codewords of the system are obtained from a product of codewords in the two codebooks, and the 8-antenna codebook design in Release 10 employs such the dual codebook structure. In the 4-antenna codebook design in current Release 12, there mainly exist two types of dual codebooks, a GoB (grid of beam) codebook and a differential codebook.

The GoB codebook is designed on a basis of an idea of beams, which is applicable to small spacing cross-polarized antenna configuration. $W=W_1W_2$, $W_1$ is a block diagonal matrix, each sub-matrix containing multiple adjacent overlapped beams and $W_1$ used for long-term and wideband feedback, and $W_2$ contains beam selection vectors and phase weighting factors; wherein a unique beam is selected from the multiple beams contained in $W_1$, and phase weighting is performed on two polarized antenna groups, and $W_2$ is used for short-term and/or narrowband feedback. Different from the GoB codebook, a $W=W_2W_1$ structure is used in the differential codebook, $W_1$ is a base matrix (vector) used for long-term and/or wideband feedback, for example, the 4-antenna codebook in Release 10 (Table 1) may be used; and $W_2$ is a unitary diagonal matrix used for tracing fluctuation of $W_1$, and is instantaneous and/or subband feedback.

However, the existing dual codebook scheme is inapplicable to various antenna configuration scenarios.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Embodiments of the present disclosure provide a method for determining a codebook, information feedback method and devices thereof, the methods being applicable to various antenna configuration scenarios.

According to a first aspect of the embodiments of the present disclosure, there is provided a method for determining a codebook, for use in precoding of a differential dual codebook that includes a first codebook for long-term and/or wideband feedback and a second codebook for instantaneous and/or subband feedback, the method including:

providing N1 codewords in the second codebook, so that complex codewords obtained by a product of codewords in the second codebook and the first codebook satisfy corresponding antenna configuration(s), where, N1 is greater than or equal to 16.

According to a second aspect of the embodiments of the present disclosure, there is provided a device for determining a codebook, for use in precoding of a differential dual codebook that includes a first codebook for long-term and/or wideband feedback and a second codebook for instantaneous and/or subband feedback; the device including:

a codebook determining unit configure to provide N1 codewords in the second codebook, so that complex codewords obtained by a product of codewords in the second codebook and the first codebook satisfy corresponding antenna configuration(s), where, N1 is greater than or equal to 16.

According to a third aspect of the embodiments of the present disclosure, there is provided a method for determining a codebook, for use in precoding of a GoB dual codebook that includes a first codebook for long-term and/or wideband feedback and a second codebook for instantaneous and/or subband feedback; the method including:

codewords in the first codebook being:

$$W_1 = \begin{pmatrix} X & 0 \\ 0 & Y \end{pmatrix} = \begin{pmatrix} X & 0 \\ 0 & D_1 X D_2 \end{pmatrix};$$

where, $D_1$ and $D_2$ are respectively unitary diagonal matrixes for respectively weighting elements at each row and each column of a matrix X, X containing $N_b$ column vectors, $N_b$ denoting the number of beams contained in the codewords of the first codebook.

According to a fourth aspect of the embodiments of the present disclosure, there is provided a device for determining a codebook, for use in precoding of a GoB dual codebook that includes a first codebook for long-term and/or wideband feedback and a second codebook for instantaneous and/or subband feedback; the device including:

a codebook determining unit configured to determine codewords in the first codebook as:

$$W_1 = \begin{pmatrix} X & 0 \\ 0 & Y \end{pmatrix} = \begin{pmatrix} X & 0 \\ 0 & D_1 X D_2 \end{pmatrix};$$

where, $D_1$ and $D_2$ are respectively unitary diagonal matrixes for respectively weighting elements at each row and each column of a matrix X, X containing $N_b$ column vectors, and $N_b$ denotes the number of beams contained in the codewords of the first codebook.

According to a fifth aspect of the embodiments of the present disclosure, there is provided an information feedback method, including:

determining, by user equipment, information needed to be fed back, by using the codebook determined in the first or the third aspect of the embodiments of the present disclosure; wherein the information needed to be fed back includes a rank index and a precoding matrix, or includes a codebook index; and transmitting the information to a network side.

According to a sixth aspect of the embodiments of the present disclosure, there is provided an information feedback device, including:

an information determining unit configured to determine information needed to be fed back by using the codebook determined in the first or the third aspect of the embodiments of the present disclosure, including the device described in the second or the fourth aspect of the embodiments of the present disclosure; wherein the information needed to be fed back includes a rank index and a precoding matrix, or includes a codebook index; and an information transmitting unit configured to transmit the information to a network side.

According to a seventh aspect of the embodiments of the present disclosure, there is provided user equipment, including the device as described in the sixth aspect of the embodiments of the present disclosure.

According to an eighth aspect of the embodiments of the present disclosure, there is provided a communication system, including the user equipment as described in the seventh aspect of the embodiments of the present disclosure.

According to a ninth aspect of the embodiments of the present disclosure, there is provided a computer-readable program, wherein when the program is executed in a device for determining a codebook, the program enables a computer to carry out the method for determining a codebook as described in the first or the third aspect of the embodiments of the present disclosure in the device for determining a codebook.

According to a tenth aspect of the embodiments of the present disclosure, there is provided a storage medium in which a computer-readable program is stored, wherein the computer-readable program enables a computer to carry out the method for determining a codebook as described in the first or the third aspect of the embodiments of the present disclosure in a device for determining a codebook.

According to an eleventh aspect of the embodiments of the present disclosure, there is provided a computer-readable program, wherein when the program is executed in an information feedback device or user equipment, the program enables a computer to carry out the information feedback method as described in the fifth aspect of the embodiments of the present disclosure in the information feedback device or the user equipment.

According to a twelfth aspect of the embodiments of the present disclosure, there is provided a storage medium in which a computer-readable program is stored, wherein the computer-readable program enables a computer to carry out the information feedback method as described in the fifth aspect of the embodiments of the present disclosure an information feedback device or user equipment.

An advantage of the embodiments of the present disclosure exists in that the methods are applicable to various antenna configuration scenarios.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings:

FIGS. 1A to 1D are schematic diagrams of antenna configurations in a 4-antenna system;

DETAILED DESCRIPTION

Figures 2, 3:
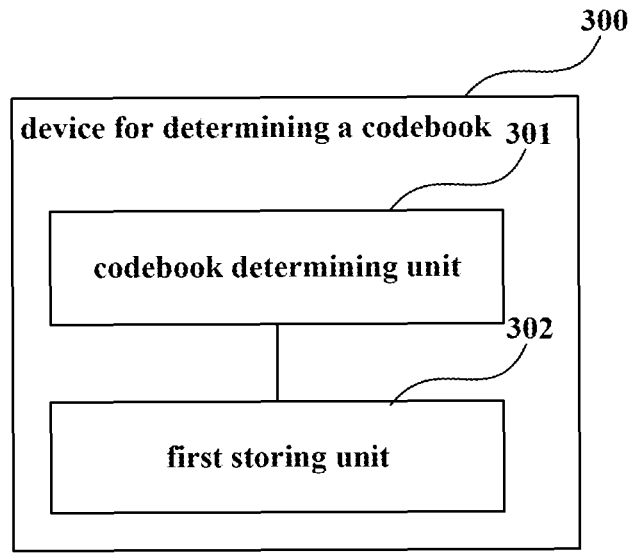
FIG. 2 is a flowchart of a method for determining a codebook of Embodiment 1 of the present disclosure.
FIG. 3 is a schematic diagram of a structure of a device for determining a codebook of Embodiment 2 of the present disclosure.

The foregoing and other features of the present disclosure shall become apparent from the following description with reference to the accompanying drawings. Particular embodiments of the present disclosure are disclosed in the description and drawings, which indicate part of the embodiments that may employ the principle of the present disclosure. It should be understood that the present disclosure is not limited to the described embodiments, on the contrary, the present disclosure includes all the modifications, variations and equivalents falling within the scope of the appended claims.

Embodiments of the present disclosure provide a method for determining a codebook and a device thereof, which are applicable to various antenna configurations shown in FIGS. 1A-1D, such as co-polarized antenna configuration of 0.5λ (including configuration of co-polarized antennas that are vertically or horizontally placed or placed at angles of)±45°, cross-polarized antenna configuration of 0.5λ, and cross-polarized and co-polarized of 4λ or more, which shall not be enumerated herein any further.

Embodiment 1

For a differential codebook of a dual codebook, in the differential codebook, $W=W_2W_1$, $W_1$ is a base matrix (vector) used for long-term and/or wideband feedback, and $W_2$ is a unitary diagonal matrix used for tracing fluctuation of $W_1$, and is instantaneous and/or subband feedback.

Currently, $W_1$ employs the 4-antenna codebook in Release 10 in most cases.

A structure used by the instantaneous and/or subband feedback $W_2$ is as follows:

$$k = 0, 1, 2, 3: C_{2,k} = \text{diag}\{1, e^{j\theta}, e^{j2\theta}, e^{j3\theta}\}; \theta = \frac{\pi}{32}, \frac{-\pi}{32}, \frac{3\pi}{32}, \frac{-3\pi}{32}; \quad (4)$$

$$k = 4, 5: C_{2,k} = \text{diag}\{1, 1, e^{j\theta}, e^{j\theta}\}; \theta = 0, \pi/2; \quad (5)$$

$$k = 6, 7: C_{2,k} = \text{diag}\{1, e^{j\theta}, 1, e^{j\theta}\}; \theta = \frac{\pi}{8}, \frac{-\pi}{8}. \quad (6)$$

In the above (4)-(6), diag {a} denotes a diagonal matrix taking a vector a as its diagonal elements, $C_{2,k}$ denotes codewords (i.e. an instantaneous and/or narrowband feedback matrix), k denotes a codeword index, and θ denotes a phase.

Wherein, the former 4 codewords, corresponding to k=0, . . . , 3, may better cover a co-polarization scenario with a spacing of 0.5λ when used together with the 4-antenna codebook in Release 10, and the complex codewords W satisfy a $[1\ e^{j\theta}\ e^{j2\theta}\ e^{j3\theta}]^T$ form of $$\theta = \frac{2\pi m}{64} (m = 1, 3, \ldots, 63);$$

while the latter 4 codewords, corresponding to k=4,5 and k=6,7, can only cover 48 of 64 codewords of forms of $[1\ e^{j\theta}\ \alpha\ \alpha e^{j\theta}]^T$, $$\theta = \frac{2\pi m}{16} (m = 0, 1, \ldots, 15),$$

α=±1, ±j after being multiplied by the base matrix.

Embodiment 1 of the present disclosure provides a method for determining a codebook, in which characteristics of codewords in different antenna configurations are taken into account comprehensively, and codewords are constructed in an instantaneous and/or narrowband feedback codebook, so that complex codewords have finer spatial domain granularities in the antenna configurations shown in FIGS. 1A-1D. Wherein, overhead of 1 bit may be increased in the instantaneous and/or narrowband feedback matrix $W_2$ that is, 16 or more codewords are used for differential feedback. In this way, finer spatial domain granularities in the cross-polarized antenna configuration with a spacing of 0.5λ may be supported.

Embodiment 1 of the present disclosure shall be described below in detail.

This embodiment is for precoding of a differential dual codebook, the differential dual codebook including a first codebook for long-term and/or wideband feedback and a second codebook for instantaneous and/or subband feedback.

FIG. 2 is a flowchart of the method for determining a codebook of Embodiment 1 of the present disclosure. As shown in FIG. 2, the method includes:

providing N1 codewords in the second codebook, so that complex codewords obtained by a product of codewords in the second codebook and the first codebook satisfy corresponding antenna configuration(s), where, N1 is greater than or equal to 16 (see step 201), for example, N1=16 or 32, etc.

In this embodiment, the provided codewords (matrices) are obtained by dividing the complex codewords by first codewords obtained based on the first codebook. As the complex codewords $W=W_2W_1$, $W_2$ is a diagonal unitary matrix, and the complex codewords W and $W_1$ are all column vectors, possible values of the differential matrix $W_2$ may derived when W and $W_1$ are known. As the structures of $W_2$ are not unique, they shall not be enumerated in this embodiment, and shall be explained by way of examples.

For example, when a rank is 1, the complex codewords W are $[1\ e^{j\theta}\ \alpha\ \alpha e^{j\theta}]^T$; where, $$\theta = \frac{2\pi m}{32}, m = 0, 1, \ldots, 31;$$

α=±1, ±j, that is, there are total 128 complex codewords. $W_1$ is known, for example, the base vector K contained in $W_1$ may use the 4-antenna codebook in Release 10 shown in Table 1; however, it is not limited thereto.

In this embodiment, when N1=16, 6 of the provided codewords are:

$C_{2,k}=\text{diag}\{1,e^{j\theta},1,e^{j\theta}\}; \theta=\pm\pi/16,\pm\pi/8,\pm 3\pi/16;$ and/or, 4 of the provided codewords are:

$C_{2,k}=\text{diag}\{1,e^{j\theta},\alpha,\alpha e^{j\theta}\}; \theta=\pm m\pi/32(m=2,4,\ldots,14);$
$\alpha=-1,\pm j;$ and/or, 2 of the provided codewords are:

$C_{2,k}=\text{diag}\{1,1,e^{j\theta},e^{j\theta}\}; \theta=0,3\pi/2;$ or $C_{2,k}=\text{diag}\{1,1,e^{j\theta}, e^{j\theta}\}; \theta=\pi/2,\pi;$ and/or, in the provided codewords,
4 codewords are:

$C_{2,k}=\text{diag}\{1,e^{j\theta},e^{j2\theta},e^{j3\theta}\}; \theta=\pm\pi/32,\pm 3\pi/32;$ Tables 2 and 3 below show examples of the codewords $W_2$ of the second codebook obtained by using the above method, which shall not be enumerated herein any further.

Table 2 shows an example of the codewords $W_2$ of the second codebook.

TABLE 2

| Index k | Codeword structure $C_{2,k}$ | Parameters |
|---|---|---|
| 0, 1, 2, 3 | diag $\{1, e^{j\theta}, e^{j2\theta}, e^{j3\theta}\}$ | $\theta = \pm\pi/32, \pm 3\pi/32$ |
| 4, 5, 6, 7, 8, 9 | diag $\{1, e^{j\theta}, 1, e^{j\theta}\}$ | $\theta = \pm\pi/16, \pm\pi/8, \pm 3\pi/16$ |
| 10, 11 | diag $\{1, 1, e^{j\theta}, e^{j\theta}\}$ | $\theta = 0, 3\pi/2$ |
| 12, 13, 14, 15 | diag $\{1, e^{j\theta}, \alpha, \alpha e^{j\theta}\}$ | $\theta = \pm\pi/16, \pm 3\pi/16, \alpha = j$ |

Table 3 shows another example of the codewords $W_2$ of the second codebook.

TABLE 3

| Index k | Codeword structure $C_{2,k}$ | Parameters |
|---|---|---|
| 0, 1, 2, 3 | diag $\{1, e^{j\theta}, e^{j2\theta}, e^{j3\theta}\}$ | $\theta = \pm\pi/32, \pm 3\pi/32$ |
| 4, 5, 6, 7, 8, 9 | diag $\{1, e^{j\theta}, 1, e^{j\theta}\}$ | $\theta = \pm\pi/16, \pm\pi/8, \pm 3\pi/16$ |
| 10, 11 | diag $\{1, 1, e^{j\theta}, e^{j\theta}\}$ | $\theta = \pi/2, \pi$ |
| 12, 13, 14, 15 | diag $\{1, e^{j\theta}, \alpha, \alpha e^{j\theta}\}$ | $\theta = \pm\pi/16, \pm 3\pi/16, \alpha = -j$ |

A generalized structure of codewords of indices 12-15 in the given $W_2$ is: diag $\{1,e^{j\theta},\alpha,\alpha e^{j\theta}\}$; where, $\theta=\pm m\pi/32$ (m=2, 4, . . . , 14); $\alpha=-1, \pm j$, and in selecting particular codewords, selected 4 codewords should have different m values, and $\alpha$ may be arbitrarily selected and is not limited.

In the second codebook shown in tables 2 and 3 and the generalized structure of codewords of indices 12-15, diag $\{a\}$ denotes a diagonal matrix with diagonal elements of a vector a, $C_{2,k}$ denotes a codeword structure, k denotes a codeword index, $\theta$ denotes a phase, and $\alpha$ denotes a phase weighting factor.

In this embodiment, the second codebook may be a codebook for a rank that equals to 1 or a rank that equals to 2; however, it is not limited thereto, and the second codebook may be determined for other ranks according to an actual situation.

When a rank is greater than 1, the second codebook shown in tables 2 and 3 and the generalized structure of codewords of indices 12-15 is also applicable. $W_1$ is obtained after performing Householder transformation on codewords of a rank of 1. However, in this process, $W_2$ is always kept constant, that is, for different ranks, such as when a rank is equal to or greater than 1, $W_2$ may use the generalized structure shown in tables 2 and 3 and the corresponding generalized structure of indices 12-15.

With the embodiment of the present disclosure, the satisfied antenna configuration(s) include(s) one or more types of the following: co-polarized antenna configuration of 0.5λ, cross-polarized antenna configuration of 0.5λ, and cross-polarized and co-polarized antenna configuration of 4λ or more.

Embodiment 2

This embodiment is for precoding of a differential dual codebook, the differential dual codebook including a first codebook for long-term and/or wideband feedback and a second codebook for instantaneous and/or subband feedback.

FIG. 3 is a schematic diagram of a structure of a device for determining a codebook of Embodiment 2 of the present disclosure. As shown in FIG. 3, the device 300 includes a codebook determining unit 301 configure to provide N1 codewords in the second codebook, so that complex codewords obtained by a product of codewords in the second codebook and the first codebook satisfy corresponding antenna configuration(s), where, N1 is greater than or equal to 16.

In this embodiment, the codebook determining unit 301 is configured to divide the complex codewords by first codewords obtained on a basis of the first codebook, so as to obtain the N1 codewords provided in the second codebook. Wherein, the complex codewords and the first codebook are known and may be prestored, and the provided codewords of the second codebook may also be stored.

In such a case, the device 300 further includes a first storing unit 302 configured to store the complex codewords, the first codebook and N1 codewords provided of the second codebook.

As described in Embodiment 1, the complex codewords $W=W_2W_1$, $W_2$ is a diagonal unitary matrix, and the complex codewords W and $W_1$ are all column vectors, possible values of the differential matrix $W_2$ may derived when W and $W_1$ are known. As the structures of $W_2$ are not unique, they shall not be enumerated in this embodiment.

In this embodiment, the second codebook may be a codebook for a rank that equals to 1 or a rank that equals to 2; however, it is not limited thereto, and the second codebook may be determined for other ranks according to an actual situation.

For example, when the rank is 1, the complex codewords W are $[1 \ e^{j\theta} \ \alpha \ \alpha e^{j\theta}]^T$; where, $$\theta = \frac{2\pi m}{32},$$

m=0, 1, . . . , 31; $\alpha=\pm 1, \pm j$, that is, there are total 128 complex codewords. $W_1$ is known, for example, the base vector K contained in $W_1$ may use the 4-antenna codebook in Release 10 shown in Table 1; however, it is not limited thereto.

In this embodiment, 6 of the codewords provided by the codebook determining unit 301 are:

$C_{2,k}=\text{diag}\{1,e^{j\theta},1,e^{j\theta}\}; \theta=\pm\pi/16,\pm\pi/8,\pm 3\pi/16;$ and/or, 4 of the provided codewords are:

$C_{2,k}=\text{diag}\{1,e^{j\theta},\alpha,\alpha e^{j\theta}\}; \theta=\pm m\pi/32(m=2,4,\ldots,14);$
$\alpha=-1,\pm j;$ and/or, 2 of the provided codewords are:

$C_{2,k}=\text{diag}\{1,1,e^{j\theta},e^{j\theta}\}; \theta=0,3\pi/2;$ or $C_{2,k}=\text{diag}\{1,1,e^{j\theta}, e^{j\theta}\}; \theta=\pi/2,\pi;$ and/or, 4 of the provided codewords are:

$$C_{2,k}=\text{diag}\{1,e^{j\theta},e^{j2\theta},e^{j3\theta}\}; \theta=\pm\pi/32,\pm 3\pi/32;$$

As there exist many cases, they shall not be enumerated herein any further, and a particular example is that the provided codewords $W_2$ of the second codebook are of the generalized structure shown in tables 2 and 3 and the corresponding generalized structure of indices 12-15.

When a rank is greater than 1, the second codebook shown in tables 2 and 3 is also applicable. $W_1$ is obtained after performing Householder transformation on codewords of a rank of 1. However, in this process, $W_2$ is always kept constant, that is, for different ranks, such as when a rank is equal to or greater than 1, $W_2$ may use the generalized structure shown in tables 2 and 3 and the corresponding generalized structure of indices 12-15.

With the embodiment of the present disclosure, the satisfied antenna configuration(s) include(s) one or more types of the following: co-polarized antenna configuration of 0.5λ, cross-polarized antenna configuration of 0.5λ, and cross-polarized and co-polarized antenna configuration of 4λ or more.

The above embodiments 1 and 2 are improvement based on an existing differential dual codebook.

However, in an embodiment of the present disclosure, an existing GoB dual codebook structure may also be based, codeword characteristics of different antenna configurations are comprehensively taken into account, and codewords in wideband and/or long-term feedback codebooks are constructed, so that they are applicable to various antenna configurations, such as co-polarized and cross-polarized antenna configuration with a spacing of 0.5λ, and antenna configuration with a spacing of 4λ or more, etc.

Embodiment 3

For a GoB dual codebook of dual codebooks, for instance, taking an 8-antenna codebook of an LTE-A system in Release 10 as an example, the structure of the existing GoB codebook is $W=W_1W_2$, $W_1$ and $W_2$ being respectively used for long-term and/or wideband and instantaneous and/or subband feedback, and the current $W_1$ has a diagonal structure as below:

$$W_1 = \begin{pmatrix} X & 0 \\ 0 & X \end{pmatrix}; \quad (7)$$

where, X contains $N_b$ column vectors and represents $N_b$ overlapped beams, $W_2$ is used for selecting beam(s) from $N_b$ beams in $W_1$, and phase weighting is performed on two cross-polarized antenna groups.

As $W_2$ is an instantaneous feedback amount, if codewords are added into $W_2$ (such as adding more phase weighting values) to support co-polarized antenna configuration with a spacing of 0.5λ and antenna configuration with a spacing of 4λ or more, system overhead will be greatly increased.

Hence, in the embodiment of the present disclosure, codewords are designed in long-term and/or wideband feedback $W_1$ to support more antenna configurations, while existing codewords are still followed in $W_2$. For example, the codewords designed in the 8-antenna codebook in Release 10 are used by $W_2$; however, it is not limited thereto, and other known codewords may also be used.

This embodiment is addressed to cases where ranks are 1 and 2 when 4-antenna configuration is employed at a transmission end.

Embodiment 3 provides a method for determining a codebook, the method including:

the structure of codewords in the first codebook ($W_1$) being:

$$W_1 = \begin{pmatrix} X & 0 \\ 0 & Y \end{pmatrix} = \begin{pmatrix} X & 0 \\ 0 & D_1XD_2 \end{pmatrix}; \quad (8)$$

where, $D_1$ and $D_2$ are respectively unitary diagonal matrixes for respectively weighting elements at each row and each column of a matrix X, X containing $N_b$ column vectors, $N_b$ denoting the number of beams contained in the codewords of the first codebook.

In a cross-polarized antenna configuration with a spacing of 0.5λ, both $D_1$ and $D_2$ are unit matrices, that is, $W_1$ is of a conventional block diagonal structure (as shown in Formula (7)).

Embodiment 3 of the present disclosure shall be described below by way of examples.

Embodiment 3 of the present disclosure provides a method for determining a codebook, for use in precoding of a GoB dual codebook that includes a first codebook for long-term and/or wideband feedback and a second codebook for instantaneous and/or subband feedback; the method including:

the codewords in the first codebook being expressed as:

$$W_1 = \begin{pmatrix} X & 0 \\ 0 & Y \end{pmatrix} = \begin{pmatrix} X & 0 \\ 0 & D_1XD_2 \end{pmatrix};$$

where, $D_1$ and $D_2$ are respectively unitary diagonal matrixes for respectively weighting elements at each row and each column of a matrix X, X containing $N_b$ column vectors, $N_b$ denoting the number of beams contained in the codewords of the first codebook; for example, values of $N_b$ may be 2, 4, and 8, etc.

In this embodiment, the codewords of the first codebook may satisfy one type of antenna configuration or simultaneously satisfy more than one types of antenna configurations. For example, there are M types of antenna configurations, the number of codewords in the first codebook is N2, the N2 codewords simultaneously corresponding to the M types of antenna configurations; wherein, corresponding to an i-th type of antenna configuration, the number of codewords is $N_i$, $$\sum_{i=1}^{M} N_i = N_2,$$

i=1~M, where, N2 and M are positive integers, and $N_i$ is an integer greater than or equal to 0.

In this embodiment, the antenna configuration includes one or more types of the following: co-polarized antenna configuration with a spacing of 0.5λ, cross-polarized antenna configuration with a spacing of 0.5λ, and cross-polarized and co-polarized antenna configuration with a spacing of 4λ or more. However, it is not limited thereto, and other existing antenna configurations may also be included.

For example, the antenna configuration includes co-polarized antenna configuration with a spacing of 0.5λ, cross-polarized antenna configuration with a spacing of 0.5λ, and antenna configuration with a spacing of 4λ, that is, M=3; the number of the codewords of the first codebook is 16, that is, N2=16; in an order of the cross-polarized antenna configuration with a spacing of 0.5λ, the co-polarized antenna configuration with a spacing of 0.5λ and the antenna configuration with a spacing of 4λ, the numbers of the codewords corresponding to each type of antenna configuration are ($N_1$, $N_2$, $N_3$), respectively, for example, sets to which the 16 codewords of the first codebook correspond respectively may be (16,0,0), (8,8,0), (8,6,2) or (8,4,4). It can be seen from the above sets that for (16,0,0), the 16 codewords correspond to the cross-polarized antenna configuration with a spacing of 0.5λ; for (8,8,0), 8 codewords correspond to the cross-polarized antenna configuration with a spacing of 0.5λ and 8 codewords correspond to the co-polarized antenna configuration with a spacing of 0.5λ; for (8,6,2), 8 codewords correspond to the cross-polarized antenna configuration with a spacing of 0.5λ, 6 codewords correspond to the co-polarized antenna configuration with a spacing of 0.5λ and 2 codewords correspond to the antenna configuration with a spacing of 4λ; and for (8,4,4), it is similar to (8,6,2), which shall not be described herein any further.

It can be seen from the above that the codewords of the first codebook may simultaneously support one, two or three types of antenna configurations. However, it is not limited to the above sets, and other sets may also be used, which shall not be described herein any further.

In this embodiment, the first codebook may be addressed to a codebook of a rank that equals to 1 or 2. However, it is not limited to the above, and it is also applicable to cases where the rank is greater than 2. Following description is given taking that the rank equals to 1 and 2 as examples.

For each type of antenna configuration, the codewords in the first codebook are obtained by dividing complex codewords by second codewords obtained on a basis of the second codebook. Similar to Embodiment 1 and Embodiment 2, and as $W=W_1W_2$, $W_2$ is known, and the complex codewords W are also known when the rank and the antenna configuration are determined, hence possible values of $W_1$ may derived when W and $W_2$ are known. As $W_1$ is not unique, they shall not be enumerated in this embodiment, and shall be explained by way of examples in the following embodiment.

Embodiment 4

This embodiment is based on Embodiment 3, and contents identical to those of Embodiment 3 shall not be described any further. Following description is given to an embodiment of the co-polarized antenna configuration with a spacing of 0.5λ.

For the co-polarized antenna configuration with a spacing of 0.5λ, a certain column in a matrix $$\begin{pmatrix} X \\ Y \end{pmatrix}$$

has a structure of $[1\ e^{j\theta}\ \beta e^{j2\theta}\ \beta e^{j3\theta}]^T$.

In this embodiment, the codewords of the first codebook may be formed on a basis of a set of column vectors of the matrix $$\begin{pmatrix} X \\ Y \end{pmatrix};$$

wherein, in a case of transmission of a single data stream, a corresponding number of column vectors are selected from a set of column vectors constituting the matrix $$\begin{pmatrix} X \\ Y \end{pmatrix}$$

to form the codewords of the first codebook, the corresponding number being $N_b$; or, in a case of transmission of more than one data streams, the set of column vectors of the matrix $$\begin{pmatrix} X \\ Y \end{pmatrix}$$

is divided into $N_b$ groups, and the codewords of the first codebook are formed by dividing the groups in a predetermined manner, such as dividing according to a wideband feedback characteristic of a beam and a codeword orthogonality principle.

It can be seen from the above embodiment that in the co-polarized antenna configuration with a spacing of 0.5λ, the complex codewords $W=W_1W_2$ formed jointly by $W_1$ and $W_2$ should have a form of $[1\ e^{j\theta}\ e^{j2\theta}\ e^{j3\theta}]^T$ and the 4-antenna codebook in the existing Release 10 has codewords of $$\theta = \frac{2\pi m}{8} (m = 0, 1, \ldots, 8)$$

for such antenna configuration. In order to support a finer spatial domain granularity, the present disclosure may employ such finer granularities as $$\theta = \frac{2\pi m}{16}(m = 0, 1, \ldots, 15), \text{ or } \theta = \frac{2\pi m}{32}(m = 0, 1, \ldots, 31),$$

etc.

Wherein, $W_2$ still uses existing codewords. For example, in this embodiment, $W_2$ uses the codewords designed in the 8-antenna codebook in Release 10; however, it is not limited thereto, and other known codewords may also be used.

In the codewords designed in the 8-antenna codebook in Release 10, when the rank is 1, $W_2=[e_n\ \alpha e_n]^T$; where, n=1, 2, ..., $N_b$; α=±1, ±j. When the rank is 2, the structure of $W_2$ is as follows:

$$W_2 = \begin{bmatrix} e_m & e_n \\ \alpha e_m & -\alpha e_n \end{bmatrix} \alpha = 1, j$$

$$(m, n) \in \{(1, 1), (2, 2), (3, 3), (4, 4), (1, 2), (1, 4), (2, 3), (2, 4)\};$$

$e_m$, and $e_n$ denote unit vectors with an m-th or an n-th element being 1 and other elements being 0, m=1, 2, 3, 4, n=1, 2, 3, 4, and α is a phase weighting factor.

When the rank equals to 1, if effects of overlapped beams of $W_1$ and beam selection of $W_2$ are not taken into account, and only a single beam is taken into account, as the phase weighting factor of $W_2$ is $\pm 1$, $\pm j$, a certain column of the matrix $$\begin{pmatrix} X \\ Y \end{pmatrix}$$

may have the structure of $[1\ e^{j\theta}\ \beta e^{j2\theta}\ \beta e^{j3\theta}]^T$; where, $\beta$ is a reciprocal of the phase weighting factor $\alpha$ in $W_2$, with a value range of $\pm 1$, $\pm j$. In order to obtain a relatively large spatial domain granularity, values of $\theta$ may be such finer granularities as $$\theta = \frac{2\pi m}{16}(m=0, 1, \ldots, 15),\ \text{or}\ \theta = \frac{2\pi m}{32}(m=0, 1, \ldots, 31).$$

Taking a multi-beam structure of $W_1$ into account, the above vectors may be divided into $N_b$ groups, which are divided according to a certain rule, such as the wideband feedback characteristic of a beam and the codeword orthogonality principle, so as to form different codewords of $W_1$.

When the rank equals to 2, in the co-polarized antenna configuration with a spacing of 0.5λ, the codewords constituting the columns of the $$\begin{pmatrix} X \\ Y \end{pmatrix}$$

are still originated from $[1\ e^{j\theta}\ \beta e^{j2\theta}\ \beta e^{j3\theta}]^T$, $\beta=\pm 1$, $\pm j$; where, $\beta$ is a reciprocal of the phase weighting factor $\alpha$ in the codewords of the second codebook, and $$\theta = \frac{2\pi m}{16}(m=0, 1, \ldots, 15)\ \text{or}\ \theta = \frac{2\pi m}{32}(m=0, 1, \ldots, 31),$$

which are finer granularities. However, in order to support orthogonal transmission between multiple data streams, the codewords constituting $W_1$ need to contain beams that are orthogonal to each other, that is, when the rank is 2, the column vectors constituting the codewords of $W_1$ are identical to those when the rank is 1; however, in constructing the first codebook, it should be satisfied that orthogonal beams are contained in a wideband and/or long-term codeword $W_1$, for use in transmission when the rank is 2.

Following description is given to two cases, $$\theta = \frac{2\pi m}{16}(m=0, 1, \ldots, 15)\ \text{and}\ \theta = \frac{2\pi m}{32}(m=0, 1, \ldots, 31).$$

When the rank is 1, in the co-polarized antenna configuration with a spacing of 0.5λ, in need to constitute complex codewords having a form shown in Formula (1), for the first codebook, for example, 4, 6, 8 and 16 codewords may be constructed respectively, which shall be described below.

Example 1 constituting 4 codewords ($i_1 = 0, 1, 3$), $$W_1(i_1) = \begin{pmatrix} X(i_1) & 0 \\ 0 & Y(i_1) \end{pmatrix} = \begin{pmatrix} X(i_1) & 0 \\ 0 & D_1(i_1)X(i_1)D_2(i_1) \end{pmatrix}, \quad (9)$$

$$X(i_1) = \begin{bmatrix} 1 & 1 & 1 & 1 \\ e^{j\frac{2\pi(4i_1)}{16}} & e^{j\frac{2\pi(4i_1+1)}{16}} & e^{j\frac{2\pi(4i_1+2)}{16}} & e^{j\frac{2\pi(4i_1+3)}{16}} \end{bmatrix}, \quad (10)$$

$$D_1(i_1) = I_{2\times 2}, \quad (11)$$

$$D_2(i_1) = \text{diag}\left\{e^{j\frac{\pi k_1}{2}}, e^{j\left(\frac{\pi}{4}+\frac{\pi k_2}{2}\right)}, e^{j\frac{\pi k_3}{2}}, e^{j\left(\frac{\pi}{4}+\frac{\pi k_4}{2}\right)}\right\} \quad (12)$$

$$k_1, k_2, k_3, k_4 \in \{0, 1, 2, 3\}.$$

Example 2 constituting 6 codewords ($i_1 = 0, 1, 2, 3, 4, 5$), $$W_1(i_1) = \begin{pmatrix} X(i_1) & 0 \\ 0 & Y(i_1) \end{pmatrix} = \begin{pmatrix} X(i_1) & 0 \\ 0 & D_1(i_1)X(i_1)D_2(i_1) \end{pmatrix}, \quad (13)$$

$$X(i_1) = \begin{bmatrix} 1 & 1 & 1 & 1 \\ e^{j\frac{2\pi(3i_1 \bmod 16)}{16}} & e^{j\frac{2\pi((3i_1+1)\bmod 16)}{16}} & e^{j\frac{2\pi((3i_1+2)\bmod 16)}{16}} & e^{j\frac{2\pi((3i_1+3)\bmod 16)}{16}} \end{bmatrix}, \quad (14)$$

$$D_1(i_1) = I_{2\times 2}, \quad (15)$$

$$D_2(i_1) = \begin{cases} \text{diag}\left\{e^{j\frac{\pi k_1}{2}}, e^{j\left(\frac{\pi}{4}+\frac{\pi k_2}{2}\right)}, e^{j\frac{\pi k_3}{2}}, e^{j\left(\frac{\pi}{4}+\frac{\pi k_4}{2}\right)}\right\} & i_1 = 0, 2, 4 \\ \text{diag}\left\{e^{j\left(\frac{\pi}{4}+\frac{\pi k_1}{2}\right)}, e^{j\frac{\pi k_2}{2}}, e^{j\left(\frac{\pi}{4}+\frac{\pi k_3}{2}\right)}, e^{j\frac{\pi k_4}{2}}\right\} & i_1 = 1, 3, 5 \end{cases} \quad (16)$$

$$k_1, k_2, k_3, k_4 \in \{0, 1, 2, 3\}.$$

Example 3 constituting 8 codewords ($i_1 = 0, 1, \ldots, 7$), with beams contained in two adjacent codewords $W_1$ being partially overlapped, $$W_1(i_1) = \begin{pmatrix} X(i_1) & 0 \\ 0 & Y(i_1) \end{pmatrix} = \begin{pmatrix} X(i_1) & 0 \\ 0 & D_1(i_1)X(i_1)D_2(i_1) \end{pmatrix}, \quad (17)$$

$$X(i_1) = \begin{bmatrix} 1 & 1 & 1 & 1 \\ e^{j\frac{2\pi(2i_1 \bmod 16)}{16}} & e^{j\frac{2\pi((2i_1+1)\bmod 16)}{16}} & e^{j\frac{2\pi((2i_1+2)\bmod 16)}{16}} & e^{j\frac{2\pi((2i_1+3)\bmod 16)}{16}} \end{bmatrix}, \quad (18)$$

$$D_1(i_1) = I_{2\times 2}, \quad (19)$$

$$D_2(i_1) = \mathrm{diag}\left\{ e^{j\frac{\pi k_1}{2}}, e^{j\left(\frac{\pi}{4}+\frac{\pi k_2}{2}\right)}, e^{j\frac{\pi k_3}{2}}, e^{j\left(\frac{\pi}{4}+\frac{\pi k_4}{2}\right)} \right\} \; k_1, k_2, k_3, k_4 \in \{0, 1, 2, 3\}. \quad (20)$$

As beam overlapping exists in adjacent codewords, the codewords given in these examples support a subsampling characteristic of the codebook, that is, only codewords of precoding matrix indices (PMIs) of even numbers are used in some periodical feedback.

Example 4

8 codewords ($i_1$=0, 1, ..., 7), with beams contained in two adjacent codewords $W_1$ being not overlapped, $$W_1(i_1) = \begin{pmatrix} X(i_1) & 0 \\ 0 & Y(i_1) \end{pmatrix} = \begin{pmatrix} X(i_1) & 0 \\ 0 & D_1(i_1)X(i_1)D_2(i_1) \end{pmatrix}, \quad (21)$$

$$X(i_1) = \begin{bmatrix} 1 & 1 & 1 & 1 \\ e^{j\frac{2\pi(4i_1)}{32}} & e^{j\frac{2\pi(4i_1+1)}{32}} & e^{j\frac{2\pi(4i_1+2)}{32}} & e^{j\frac{2\pi(4i_1+3)}{32}} \end{bmatrix}, \quad (22)$$

$$D_1(i_1) = I_{2\times 2}, \quad (23)$$

$$D_2(i_1) = \mathrm{diag}\left\{ e^{j\frac{\pi k_1}{2}}, e^{j\left(\frac{\pi}{8}+\frac{\pi k_2}{2}\right)}, e^{j\left(\frac{\pi}{4}+\frac{\pi k_3}{2}\right)}, e^{j\left(\frac{3\pi}{8}+\frac{\pi k_4}{2}\right)} \right\} \quad (24)$$

$k_1, k_2, k_3, k_4 \in \{0, 1, 2, 3\}$,

Example 5

16 codewords ($i_1$=0, 1, ..., 15), $$W_1(i_1) = \begin{pmatrix} X(i_1) & 0 \\ 0 & Y(i_1) \end{pmatrix} = \begin{pmatrix} X(i_1) & 0 \\ 0 & D_1(i_1)X(i_1)D_2(i_1) \end{pmatrix}, \quad (25)$$

$$X(i_1) = \begin{bmatrix} 1 & 1 & 1 & 1 \\ e^{j\frac{2\pi(2i_1 \bmod 32)}{32}} & e^{j\frac{2\pi((2i_1+1)\bmod 32)}{32}} & e^{j\frac{2\pi((2i_1+2)\bmod 32)}{32}} & e^{j\frac{2\pi((2i_1+3)\bmod 32)}{32}} \end{bmatrix}, \quad (26)$$

$$D_1(i_1) = I_{2\times 2}, \quad (27)$$

$$D_2(i_1) = \begin{cases} \mathrm{diag}\left\{ e^{j\frac{\pi k_1}{2}}, e^{j\left(\frac{\pi}{8}+\frac{\pi k_2}{2}\right)}, e^{j\left(\frac{\pi}{4}+\frac{\pi k_3}{2}\right)}, e^{j\left(\frac{3\pi}{8}+\frac{\pi k_4}{2}\right)} \right\} (i_1 = 0, 2, \ldots, 14) \\ \mathrm{diag}\left\{ e^{j\left(\frac{\pi}{4}+\frac{\pi k_1}{2}\right)}, e^{j\left(\frac{3\pi}{8}+\frac{\pi k_2}{2}\right)}, e^{j\frac{\pi k_3}{2}}, e^{j\left(\frac{\pi}{8}+\frac{\pi k_4}{2}\right)} \right\} (i_1 = 1, 3, \ldots, 15) \end{cases} \quad (28)$$

$k_1, k_2, k_3, k_4 \in \{0, 1, 2, 3\}$.

As beam overlapping exists in adjacent codewords, the codewords given in these examples support a subsampling characteristic of the codebook, that is, only codewords of PMIs of even numbers are used in some periodical feedback.

When the rank is 2, in the co-polarized antenna configuration with a spacing of 0.5λ, the codewords constituting the columns of the $$\begin{pmatrix} X \\ Y \end{pmatrix}$$

are still originated from $[1 \; e^{j\theta} \; \beta e^{j2\theta} \; \beta e^{j3\theta}]^T$, $\beta = \pm 1, \pm j$; where, $$\theta = \frac{2\pi m}{16}(m = 0, 1, \ldots, 15) \text{ or } \theta = \frac{2\pi m}{32}(m = 0, 1, \ldots, 31),$$

which are finer granularities.

In order to support orthogonal transmission between multiple data streams, the codewords constituting $W_1$ need to contain beams that are orthogonal to each other, that is, when the rank is 2, the column vectors constituting the codewords of $W_1$ are identical to those when the rank is 1; however, in constructing, it should be satisfied that orthogonal beams are contained in a wideband codeword $W_1$, for use in transmission when the rank is 2. As there exist many cases, they shall not be enumerated herein any further, which shall be described below by way of examples.

Taking that the beam selection in the codewords of $W_2$ supports only 8 cases of combinations into consideration, such as $(m,n) \in \{(1,1),(2,2),(3,3),(4,4),(1,2),(1,4),(2,3),(2,4)\}$, two orthogonal beams may be placed in a column (1,4) or (2,3).

In the present disclosure, only one example of selecting parameters of $W_2$ is given. However, it is not limited thereto, and when $W_2$ is configured with other parameters, it needs only to ensure that a combination of indexes of columns containing two orthogonal beams are in a set of (m,n) combinations supported by $W_2$.

Taking two cases of $$\theta = \frac{2\pi m}{16}(m=0, 1, \ldots, 15) \text{ and } \theta = \frac{2\pi m}{32}(m=0, 1, \ldots, 31)$$

into consideration, when $N_b=4$, the first codebook may respectively construct 4, 8 and 16 codewords, as shown below; where, $$b_m = \begin{bmatrix} 1 & e^{j\frac{2\pi m}{16}} \end{bmatrix}^T \text{ or } b_m = \begin{bmatrix} 1 & e^{j\frac{2\pi m}{32}} \end{bmatrix}^T,$$

denoting that they are applicable to codewords of the co-polarized 2-antenna configuration with a spacing of $0.5\lambda$.

Example 1

4 codewords ($i_1=0, 1, 2, 3$), $$W_1(i_1) = \begin{bmatrix} X(i_1) & 0 \\ 0 & D_1(i_1)X(i_1)D_2(i_1) \end{bmatrix}; \quad (29)$$

$$b_m = \begin{bmatrix} 1 \\ e^{j\frac{2\pi m}{16}} \end{bmatrix}; \quad (30),$$

$$X(0) = [b_0 \ b_1 \ b_5 \ b_4]; \quad (31),$$

$$X(1) = [b_2 \ b_3 \ b_7 \ b_6]; \quad (32),$$

$$X(2) = [b_8 \ b_9 \ b_{13} \ b_{12}]; \quad (33),$$

$$X(3) = [b_{10} \ b_{11} \ b_{15} \ b_{14}]; \quad (34),$$

$$D_1(i_1) = I_{2\times 2}; \quad (35),$$

$$D_2(i_1) = \text{diag}\left\{e^{j\frac{\pi k_1}{2}}, \exp\left(\frac{j\pi}{4}+\frac{\pi k_2}{2}\right), \exp\left(\frac{j\pi}{4}+\frac{\pi k_3}{2}\right), e^{j\frac{\pi k_4}{2}}\right\} \quad (36)$$

$$k_1, k_2, k_3, k_4 \in \{0, 1, 2, 3\}.$$

Example 2

8 codewords ($i_1=0, 1, \ldots, 7$), with beams contained in two adjacent codewords $W_1$ being partially overlapped, $$W_1(i_1) = \begin{bmatrix} X(i_1) & 0 \\ 0 & D_1(i_1)X(i_1)D_2(i_1) \end{bmatrix}, \quad (37)$$

$$b_m = \begin{bmatrix} 1 \\ e^{j\frac{2\pi m}{16}} \end{bmatrix}; \quad (38),$$

$$X(0) = [b_0 \ b_1 \ b_5 \ b_4]; \quad (39),$$

$$X(1) = [b_1 \ b_2 \ b_6 \ b_5]; \quad (40),$$

$$X(2) = [b_2 \ b_3 \ b_7 \ b_6]; \quad (41),$$

$$X(3) = [b_3 \ b_4 \ b_0 \ b_7]; \quad (42),$$

$$X(4) = [b_8 \ b_9 \ b_{13} \ b_{12}]; \quad (43),$$

$$X(5) = [b_9 \ b_{10} \ b_{14} \ b_{13}]; \quad (44),$$

$$X(6) = [b_{10} \ b_{11} \ b_{15} \ b_{14}]; \quad (45),$$

$$X(7) = [b_{11} \ b_{12} \ b_8 \ b_{15}]; \quad (46),$$

-continued $$D_1(i_1) = I_{2\times 2}, \quad (47)$$

$$D_2(i_1) = \text{diag}\left\{e^{j\frac{\pi k_1}{2}}, \exp\left(\frac{j\pi}{4}+\frac{\pi k_2}{2}\right), \exp\left(\frac{j\pi}{4}+\frac{\pi k_3}{2}\right), e^{j\frac{\pi k_4}{2}}\right\} \quad (48)$$

$$k_1, k_2, k_3, k_4 \in \{0, 1, 2, 3\}.$$

As beam overlapping exists in adjacent codewords, the codewords given in these examples support a subsampling characteristic of the codebook, that is, only codewords of PMIs of even numbers are used in some periodical feedback.

Example 3

8 codewords ($i_1=0, 1, \ldots, 7$) case 2, with beams contained in two adjacent codewords $W_1$ being not overlapped, $$W_1(i_1) = \begin{bmatrix} X(i_1) & 0 \\ 0 & D_1(i_1)X(i_1)D_2(i_1) \end{bmatrix}; \quad (49),$$

$$b_m = \begin{bmatrix} 1 \\ e^{j\frac{2\pi m}{32}} \end{bmatrix}; \quad (50),$$

$$X(0) = [b_0 \ b_1 \ b_5 \ b_4]; \quad (51),$$

$$X(1) = [b_2 \ b_3 \ b_7 \ b_6]; \quad (52),$$

$$X(2) = [b_8 \ b_9 \ b_{13} \ b_{12}]; \quad (53),$$

$$X(3) = [b_{10} \ b_{11} \ b_{15} \ b_{14}]; \quad (54),$$

$$X(4) = [b_{16} \ b_{17} \ b_{21} \ b_{20}]; \quad (55),$$

$$X(5) = [b_{18} \ b_{19} \ b_{23} \ b_{22}]; \quad (56),$$

$$X(6) = [b_{24} \ b_{25} \ b_{29} \ b_{28}]; \quad (57),$$

$$X(7) = [b_{26} \ b_{27} \ b_{31} \ b_{30}]; \quad (58),$$

$$D_1(i_1) = I_{2\times 2}; \quad (59),$$

$$D_2(i_1) = \quad (60)$$

$$\begin{cases} \text{diag}\left\{e^{j\frac{\pi k_1}{2}}, e^{j\left(\frac{\pi}{8}+\frac{\pi k_2}{2}\right)}, e^{j\left(\frac{\pi}{8}+\frac{\pi k_3}{2}\right)}, e^{j\frac{\pi k_4}{2}}\right\} & (i_1=0, 2, 4, 6) \\ \text{diag}\left\{e^{j\left(\frac{\pi}{4}+\frac{\pi k_1}{2}\right)}, e^{j\left(\frac{3\pi}{8}+\frac{\pi k_2}{2}\right)}, e^{j\left(\frac{3\pi}{8}+\frac{\pi k_3}{2}\right)}, e^{j\left(\frac{\pi}{4}+\frac{\pi k_4}{2}\right)}\right\} & (i_1=1, 3, 5, 7) \end{cases}$$

$$k_1, k_2, k_3, k_4 \in (0, 1, 2, 3).$$

Example 4

16 codewords ($i_1=0, 1, \ldots, 15$)

$$W_1(i_1) = \begin{bmatrix} X(i_1) & 0 \\ 0 & D_1(i_1)X(i_1)D_2(i_1) \end{bmatrix}, \quad (61)$$

$$b_m = \begin{bmatrix} 1 \\ e^{j\frac{2\pi m}{32}} \end{bmatrix}; \quad (62),$$

$$X(0) = [b_0 \ b_1 \ b_5 \ b_4]; \quad (63),$$

$$X(1) = [b_1 \ b_2 \ b_6 \ b_5]; \quad (64),$$

$$X(2) = [b_2 \ b_3 \ b_7 \ b_6]; \quad (65),$$

$$X(3) = [b_3 \ b_4 \ b_8 \ b_7]; \quad (66),$$

-continued $$X(4) = [b_8 \quad b_9 \quad b_{13} \quad b_{12}];\quad (67)$$

$$X(5) = [b_9 \quad b_{10} \quad b_{14} \quad b_{13}];\quad (68)$$

$$X(6) = [b_{10} \quad b_{11} \quad b_{15} \quad b_{14}];\quad (69)$$

$$X(7) = [b_{11} \quad b_{12} \quad b_{16} \quad b_{15}];\quad (70)$$

$$X(8) = [b_{16} \quad b_{17} \quad b_{21} \quad b_{20}];\quad (71)$$

$$X(9) = [b_{17} \quad b_{18} \quad b_{22} \quad b_{21}];\quad (72)$$

$$X(10) = [b_{18} \quad b_{19} \quad b_{23} \quad b_{22}];\quad (73)$$

$$X(11) = [b_{19} \quad b_{20} \quad b_{24} \quad b_{23}];\quad (74)$$

$$X(12) = [b_{24} \quad b_{25} \quad b_{29} \quad b_{28}];\quad (75)$$

$$X(13) = [b_{25} \quad b_{26} \quad b_{30} \quad b_{29}];\quad (76)$$

$$X(14) = [b_{26} \quad b_{27} \quad b_{31} \quad b_{30}];\quad (77)$$

$$X(15) = [b_{27} \quad b_{28} \quad b_0 \quad b_{31}];\quad (78)$$

$$D_1(i_1) = I_{2\times 2},\quad (79)$$

$$D_2(i_1) = \quad (80)$$

$$\begin{cases} \text{diag}\{e^{j\frac{\pi k_1}{2}}, e^{j\left(\frac{\pi}{8}+\frac{\pi k_2}{2}\right)}, e^{j\left(\frac{\pi}{8}+\frac{\pi k_3}{2}\right)}, e^{j\frac{\pi k_4}{2}}\}(i_1 = 0, 4, 8, 12) \\ \text{diag}\{e^{j\left(\frac{\pi}{8}+\frac{\pi k_1}{2}\right)}, e^{j\left(\frac{\pi}{4}+\frac{\pi k_2}{2}\right)}, e^{j\left(\frac{\pi}{4}+\frac{\pi k_3}{2}\right)}, e^{j\left(\frac{\pi}{8}+\frac{\pi k_4}{2}\right)}\}(i_1 = 1, 5, 9, 13) \\ \text{diag}\{e^{j\left(\frac{\pi}{4}+\frac{\pi k_1}{2}\right)}, e^{j\left(\frac{3\pi}{8}+\frac{\pi k_2}{2}\right)}, e^{j\left(\frac{3\pi}{8}+\frac{\pi k_3}{2}\right)}, e^{j\left(\frac{\pi}{4}+\frac{\pi k_4}{2}\right)}\}(i_1 = 2, 6, 10, 14) \\ diag\{e^{j\left(\frac{3\pi}{8}+\frac{\pi k_1}{2}\right)}, e^{j\frac{\pi k_2}{2}}, e^{j\frac{\pi k_3}{2}}, e^{j\left(\frac{3\pi}{8}+\frac{\pi k_4}{2}\right)}\}(i_1 = 3, 7, 11, 15) \end{cases}$$

$$k_1, k_2, k_3, k_4 \in \{0, 1, 2, 3\}.$$

As beam overlapping exists in adjacent codewords, the codewords given in these examples support a subsampling characteristic of the codebook, that is, codewords of PMIs of even numbers are only used in some periodical feedback.

In the design of the codewords in the co-polarized antenna configuration with a spacing of 0.5λ when the rank is 2, only part of the codewords in $W_2$ are used, such as a combination of $(m,n) \in \{(2,3), (1,4)\}$, hence, if it is detected that related codewords in the above examples 1-4 are employed in $W_1$ in implementation, the PMIs of $W_2$ may only be selected from related combinations of $(m,n) \in \{(2,3), (1,4)\}$.

The co-polarized antenna configuration with a spacing of 0.5λ when the rank is 1 and 2 is described above by way of examples. Following embodiment shall be described taking the antenna configuration with a spacing of 4λ as an example.

Embodiment 5

This embodiment is based on Embodiment 3, and contents identical to those of Embodiment 3 shall not be described any further. Following description is given to an embodiment of the antenna configuration with a spacing of 4λ.

As there exist many cases, they shall not be enumerated herein any further, which shall be described below by way of examples.

In this embodiment, in the antenna configuration with a spacing of 4λ, the 4-antenna codewords in Release 10 may be used as the complex codewords of $W_1 W_2$; however, it is not limited thereto.

In the 4-antenna codewords in Release 10 shown in Table 1, it can be seen by calculating and observing $W_i^{\{1\}}$ (i=0, 1, . . . , 15) therein that, $W_0^{\{1\}}$ and $W_8^{\{1\}}$ may both be written into a form of $[1 \ 1 \ \alpha \ \alpha]^T$, and corresponding α are 1 and −1 respectively;

$W_1^{\{1\}}$ and $W_9^{\{1\}}$ may both be written into a form of $[1 \ j \ \alpha \ \alpha j]^T$, and corresponding α are −1 and 1 respectively;

$W_2^{\{1\}}$ and $W_{10}^{\{1\}}$ may both be written into a form of $[1 \ -1 \ \alpha \ -\alpha]^T$, and corresponding α are 1 and −1 respectively;

$W_3^{\{1\}}$ and $W_{11}^{\{1\}}$ may both be written into a form of $[1 \ -j \ \alpha \ -\alpha j]^T$, and corresponding α are −1 and 1 respectively;

$W_{12}^{\{1\}}$ and $W_{13}^{\{1\}}$ may both be written into a form of $[1 \ 1 \ \alpha \ -\alpha]^T$, and corresponding α are 1 and −1 respectively;

$W_{14}^{\{1\}}$ and $W_{15}^{\{1\}}$ may both be written into a form of $[1 \ -1 \ \alpha \ \alpha]^T$, and corresponding α are 1 and −1 respectively;

and $W_4^{\{1\}}$, $W_5^{\{1\}}$, $W_6^{\{1\}}$ and $W_7^{\{1\}}$ may not be written into the same forms as other codewords.

Hence, when the rank equals to 1, a certain column of the matrix $$\begin{pmatrix} X \\ Y \end{pmatrix}$$

may have the following structure:

$$\begin{pmatrix} X \\ Y \end{pmatrix}_i \in \left\{ \begin{bmatrix} 1 \\ 1 \\ 1 \\ 1 \end{bmatrix}, \begin{bmatrix} 1 \\ -1 \\ 1 \\ 1 \end{bmatrix}, \begin{bmatrix} 1 \\ 1 \\ -1 \\ 1 \end{bmatrix}, \begin{bmatrix} 1 \\ -1 \\ 1 \\ -1 \end{bmatrix}, \begin{bmatrix} 1 \\ j \\ 1 \\ j \end{bmatrix}, \begin{bmatrix} 1 \\ -j \\ 1 \\ -j \end{bmatrix}, \right. \quad (81)$$

$$\left. \begin{bmatrix} 1 \\ \frac{1+j}{\sqrt{2}} \\ j \\ \frac{-1+j}{\sqrt{2}} \end{bmatrix}, \begin{bmatrix} 1 \\ \frac{-1+j}{\sqrt{2}} \\ -j \\ \frac{1+j}{\sqrt{2}} \end{bmatrix}, \begin{bmatrix} 1 \\ \frac{-1-j}{\sqrt{2}} \\ j \\ \frac{1-j}{\sqrt{2}} \end{bmatrix}, \begin{bmatrix} 1 \\ \frac{1-j}{\sqrt{2}} \\ -j \\ \frac{-1-j}{\sqrt{2}} \end{bmatrix} \right\}.$$

It can be seen from (81) that 10 column vectors are contained; and in order to expand so as to increase maturity, other column vectors may also be added; for example, vectors $[1 \ j \ 1 \ -j]^T$, $[1 \ -j \ 1 \ j]^T$, etc., may be added.

In constructing $N_b$ columns of matrix $$\begin{pmatrix} X \\ Y \end{pmatrix},$$

it may be obtained by arbitrary permutation and combination of the above 10 or 12 column vectors, so as to obtain the codewords of the first codebook.

It can be seen from above that in this embodiment, for the antenna configuration with a spacing of 4λ, when the rank equal to 1, a certain column in the matrix $$\begin{pmatrix} X \\ Y \end{pmatrix}$$

may employ the structure shown in (81); for example, $$\binom{X}{Y}_i \in \left\{ \begin{bmatrix} 1\\1\\1\\1 \end{bmatrix}, \begin{bmatrix} 1\\-1\\1\\1 \end{bmatrix}, \begin{bmatrix} 1\\1\\-1\\1 \end{bmatrix}, \begin{bmatrix} 1\\-1\\1\\-1 \end{bmatrix}, \begin{bmatrix} 1\\j\\1\\j \end{bmatrix}, \begin{bmatrix} 1\\-j\\1\\-j \end{bmatrix}, \begin{bmatrix} 1\\j\\1\\-j \end{bmatrix}, \right.$$

$$\left. \begin{bmatrix} 1\\-j\\1\\j \end{bmatrix}, \begin{bmatrix} 1\\\frac{1+j}{\sqrt{2}}\\j\\\frac{-1+j}{\sqrt{2}} \end{bmatrix}, \begin{bmatrix} 1\\\frac{-1+j}{\sqrt{2}}\\-j\\\frac{1+j}{\sqrt{2}} \end{bmatrix}, \begin{bmatrix} 1\\\frac{-1-j}{\sqrt{2}}\\j\\\frac{1-j}{\sqrt{2}} \end{bmatrix}, \begin{bmatrix} 1\\\frac{1-j}{\sqrt{2}}\\-j\\\frac{-1-j}{\sqrt{2}} \end{bmatrix} \right\};$$

and the codewords of the first codebook are formed according to a set formed by the column vectors of the above $$\binom{X}{Y}_i;$$

where, $D_1$ and $D_2$ are respectively unitary diagonal matrixes for respectively weighting elements at each row and each column of the matrix X, X containing $N_b$ column vectors, $N_b$ being 4 or 8.

In this embodiment, in the antenna configuration with a spacing of 4λ, when the rank equals to 2, for example, the codewords with a rank of 2 in Table 1 are still introduced into the design of $W_1$. Table 2 gives particular expressions of 16 codewords with a rank of 2 in Release 10, in which normalized coefficients are neglected.

TABLE 2

Codewords with a rank of 2 in Release 10

| index | Codewords |
|---|---|
| 0 | $\begin{pmatrix} 1 & 1 \\ 1 & -1 \\ 1 & -1 \\ 1 & 1 \end{pmatrix}$ |
| 1 | $\begin{pmatrix} 1 & -j \\ j & 1 \\ -1 & -j \\ -j & 1 \end{pmatrix}$ |
| 2 | $\begin{pmatrix} 1 & -1 \\ -1 & 1 \\ 1 & 1 \\ -1 & -1 \end{pmatrix}$ |
| 3 | $\begin{pmatrix} 1 & j \\ -j & 1 \\ -1 & j \\ j & 1 \end{pmatrix}$ |
| 4 | $\begin{pmatrix} 1 & \frac{-1-j}{\sqrt{2}} \\ \frac{1+j}{\sqrt{2}} & j \\ j & \frac{-1+j}{\sqrt{2}} \\ \frac{-1+j}{\sqrt{2}} & 1 \end{pmatrix}$ |
| 5 | $\begin{pmatrix} 1 & \frac{1-j}{\sqrt{2}} \\ \frac{-1+j}{\sqrt{2}} & -j \\ -j & \frac{1+j}{\sqrt{2}} \\ \frac{1+j}{\sqrt{2}} & 1 \end{pmatrix}$ |
| 6 | $\begin{pmatrix} 1 & -j \\ \frac{-1-j}{\sqrt{2}} & \frac{1-j}{\sqrt{2}} \\ j & 1 \\ \frac{1-j}{\sqrt{2}} & \frac{1+j}{\sqrt{2}} \end{pmatrix}$ |
| 7 | $\begin{pmatrix} 1 & j \\ \frac{1-j}{\sqrt{2}} & \frac{-1-j}{\sqrt{2}} \\ -j & 1 \\ \frac{-1-j}{\sqrt{2}} & \frac{-1+j}{\sqrt{2}} \end{pmatrix}$ |
| 8 | $\begin{pmatrix} 1 & 1 \\ 1 & 1 \\ -1 & 1 \\ -1 & 1 \end{pmatrix}$ |
| 9 | $\begin{pmatrix} 1 & -j \\ j & -1 \\ 1 & j \\ j & 1 \end{pmatrix}$ |
| 10 | $\begin{pmatrix} 1 & -1 \\ -1 & -1 \\ -1 & 1 \\ 1 & 1 \end{pmatrix}$ |
| 11 | $\begin{pmatrix} 1 & 1 \\ -j & j \\ 1 & 1 \\ -j & j \end{pmatrix}$ |
| 12 | $\begin{pmatrix} 1 & 1 \\ 1 & 1 \\ 1 & -1 \\ -1 & 1 \end{pmatrix}$ |

TABLE 2-continued

Codewords with a rank of 2 in Release 10

| index | Codewords |
|---|---|
| 13 | $\begin{pmatrix} 1 & -1 \\ 1 & 1 \\ -1 & 1 \\ 1 & 1 \end{pmatrix}$ |
| 14 | $\begin{pmatrix} 1 & 1 \\ -1 & 1 \\ 1 & 1 \\ 1 & -1 \end{pmatrix}$ |
| 15 | $\begin{pmatrix} 1 & -1 \\ -1 & 1 \\ -1 & -1 \\ -1 & -1 \end{pmatrix}$ |

Taking supporting the codewords in Release 10 and the beam selection factor in $W_2$ into account comprehensively, following 4 codewords are available for selection:

$$\begin{pmatrix} X \\ Y \end{pmatrix} \in \left[ \begin{pmatrix} 1 & 1 & 1 & 1 \\ 1 & -1 & 1 & -1 \\ 1 & 1 & 1 & 1 \\ 1 & -1 & -1 & 1 \end{pmatrix} \begin{pmatrix} 1 & 1 & 1 & 1 \\ \frac{1+j}{\sqrt{2}} & \frac{j-1}{\sqrt{2}} & \frac{-1-j}{\sqrt{2}} & \frac{1-j}{\sqrt{2}} \\ j & -j & j & -j \\ \frac{j-1}{\sqrt{2}} & \frac{1+j}{\sqrt{2}} & \frac{1-j}{\sqrt{2}} & \frac{-1-j}{\sqrt{2}} \end{pmatrix} \right.$$

$$\left. \begin{pmatrix} 1 & 1 & 1 & 1 \\ j & -j & 1 & -1 \\ 1 & 1 & 1 & 1 \\ j & -j & -1 & 1 \end{pmatrix} \begin{pmatrix} 1 & 1 & 1 & 1 \\ 1 & -1 & \frac{1+j}{\sqrt{2}} & \frac{-1-j}{\sqrt{2}} \\ 1 & 1 & j & j \\ -1 & 1 & \frac{-1+j}{\sqrt{2}} & \frac{1-j}{\sqrt{2}} \end{pmatrix} \right].$$

It can be seen from above that in this embodiment, for the antenna configuration with a spacing of 4λ, when the rank equals to 1:

a certain column in the matrix $$\begin{pmatrix} X \\ Y \end{pmatrix}$$

may employ the structure shown in (82), which shall not be described herein any further. In this way, the codewords of the first codebook may be formed according to a set constituted by the column vectors in (82); where, $D_1$ and $D_2$ are respectively unitary diagonal matrixes for respectively weighting elements at each row and each column of the matrix X, X containing $N_b$ column vectors, $N_b$ being 4 or 8.

Embodiment 6

This embodiment is based on embodiments 3-5. In this embodiment, the codewords of the first codebook may satisfy one type of antenna configuration or simultaneously satisfy more than one types of antenna configurations.

In this embodiment, as there exist many cases, they shall not be enumerated herein any further, and description is given taking the following case as an example only.

When the codewords $W_1$ of the first codebook representing the long-term and/or wideband employ 4 bits for feedback, 16 codewords are contained. In order to simultaneously support the co-polarized and cross-polarized antenna configuration with a spacing of 0.5λ and antenna configuration with a spacing of 4λ, ($N_1$, $N_2$, $N_3$) codewords may be respectively determined for the above three types of antenna configurations according to priorities of the antenna configurations or in other manners. Hence, the codewords of the first codebook are formed by combining the codewords to which each type of antenna configuration corresponds.

For example, in this embodiment, following order is used: the cross-polarized antenna configuration with a spacing of 0.5λ, co-polarized antenna configuration with a spacing of 0.5λ and antenna configuration with a spacing of 4λ.

When the rank equals to 1:

the codewords of the first codebook are 16, that is, N2=16;

three types of antenna configurations are used, that is, M=3; and an order of the cross-polarized antenna configuration with a spacing of 0.5λ, co-polarized with a spacing of 0.5λ and antenna configuration with a spacing of 4λ is used;

it is determined that the number of the codewords corresponding to each type of antenna configuration is ($N_1$, $N_2$, $N_3$); for example, the sets to which 16 codewords of the first codebook correspond respectively are (16,0,0), (8,8,0), (8,6,2) or (8,4,4).

It can be seen from the above sets that for (16,0,0), the 16 codewords correspond to the cross-polarized antenna configuration with a spacing of 0.5λ; for (8,8,0), 8 codewords correspond to the cross-polarized antenna configuration with a spacing of 0.5λ and 8 codewords correspond to the co-polarized antenna configuration with a spacing of 0.5λ; for (8,6,2), 8 codewords correspond to the cross-polarized antenna configuration with a spacing of 0.5λ, 6 codewords correspond to the co-polarized antenna configuration with a spacing of 0.5λ and 2 codewords correspond to the antenna configuration with a spacing of 4λ; and for (8,4,4), it is similar to (8,6,2), which shall not be described herein any further.

In this embodiment, for the cross-polarized antenna configuration with a spacing of 0.5λ, the used codewords may be determined according to the prior art; for example, when 16, 8 and 4 codewords are used, following codewords may be used:

Example 1

4 codewords, $$W_1(i_1) = \begin{pmatrix} X(i_1) & 0 \\ 0 & Y(i_1) \end{pmatrix} = \begin{pmatrix} X(i_1) & 0 \\ 0 & D_1(i_1)X(i_1)D_2(i_1) \end{pmatrix}, \quad (83)$$

$$X(i_1) = \begin{bmatrix} 1 & 1 & 1 & 1 \\ e^{j\frac{2\pi(4i_1)}{16}} & e^{j\frac{2\pi(4i_1+1)}{16}} & e^{j\frac{2\pi(4i_1+2)}{16}} & e^{j\frac{2\pi(4i_1+3)}{16}} \end{bmatrix}, \quad (84)$$

$$D_1(i_1) = I_{2\times 2}, \quad (85)$$

$$D_2(i_1) = I_{4\times 4}. \quad (86)$$

Example 2

8 codewords, with beams contained in two adjacent codewords $W_1$ being not overlapped, $$W_1(i_1) = \begin{pmatrix} X(i_1) & 0 \\ 0 & Y(i_1) \end{pmatrix} = \begin{pmatrix} X(i_1) & 0 \\ 0 & D_1(i_1)X(i_1)D_2(i_1) \end{pmatrix}, \quad (87)$$

$$X(i_1) = \begin{bmatrix} 1 & 1 & 1 & 1 \\ e^{j\frac{2\pi(4i_1)}{32}} & e^{j\frac{2\pi(4i_1+1)}{32}} & e^{j\frac{2\pi(4i_1+2)}{32}} & e^{j\frac{2\pi(4i_1+3)}{32}} \end{bmatrix}, \quad (88)$$

$$D_1(i_1) = I_{2\times 2}, \quad (89)$$

$$D_2(i_1) = I_{4\times 4}. \quad (90)$$

Example 3

8 codewords, with beams contained in two adjacent codewords $W_1$ being partially overlapped, $$W_1(i_1) = \begin{pmatrix} X(i_1) & 0 \\ 0 & Y(i_1) \end{pmatrix} = \begin{pmatrix} X(i_1) & 0 \\ 0 & D_1(i_1)X(i_1)D_2(i_1) \end{pmatrix}, \quad (91)$$

$$X(i_1) = \begin{bmatrix} 1 & 1 & 1 & 1 \\ e^{j\frac{2\pi(2i_1 \bmod 32)}{16}} & e^{j\frac{2\pi((2i_1+1)\bmod 32)}{16}} & e^{j\frac{2\pi((2i_1+2)\bmod 32)}{16}} & e^{j\frac{2\pi((2i_1+3)\bmod 32)}{16}} \end{bmatrix}, \quad (92)$$

$$D_1(i_1) = I_{2\times 2}, \quad (93)$$

$$D_2(i_1) = I_{4\times 4}. \quad (94)$$

Example 4

16 codewords, $$W_1(i_1) = \begin{pmatrix} X(i_1) & 0 \\ 0 & Y(i_1) \end{pmatrix} = \begin{pmatrix} X(i_1) & 0 \\ 0 & D_1(i_1)X(i_1)D_2(i_1) \end{pmatrix}, \quad (95)$$

$$X(i_1) = \begin{bmatrix} 1 & 1 & 1 & 1 \\ e^{j\frac{2\pi(2i_1 \bmod 32)}{32}} & e^{j\frac{2\pi((2i_1+1)\bmod 32)}{32}} & e^{j\frac{2\pi((2i_1+2)\bmod 32)}{32}} & e^{j\frac{2\pi((2i_1+3)\bmod 32)}{32}} \end{bmatrix}, \quad (96)$$

$$D_1(i_1) = I_{2\times 2}; \quad (97),$$

$$D_2(i_1) = I_{4\times 4}. \quad (98)$$

Description is given by way of examples. When the codewords $W_1$ representing the long-term and/or wideband employ 4 bits for feedback, 16 codewords are contained. In order to simultaneously support the cross-polarized antenna configuration with a spacing of 0.5λ, co-polarized antenna configuration with a spacing of 0.5λ and antenna configuration with a spacing of 4λ, sets of the above three types of antenna configurations may be determined according to priorities of them or in other manners, which are possibly (16,0,0), (8,8,0), (8,6,2) or (8,4,4).

When the rank equals to 1:

example 1: a set to which the codewords correspond is (16,0,0);

wherein, (16,0,0) corresponds respectively to the three types of antenna configurations, and a structure of $W_1$ is formed by combining the codewords shown in formulae (95)-(98);

example 2: a set to which the codewords correspond is (8,8,0);

wherein, (8,8,0) corresponds respectively to the three types of antenna configurations, and a structure of $W_1$ is formed by combining the codewords shown in formulae (87)-(90) (or (91)-(94)) and (17)-(20) (or (21)-(24));

example 3: a set to which the codewords correspond is (8,4,4);

wherein, (8,4,4) corresponds respectively to the three types of antenna configurations, and former 12 codewords of $W_1$ ($i_1$=0, . . . , 11) are formed by combining the codewords shown in formulae (87)-(90) (or (91)-(94)) and formulae (9)-(12);

when $i_1$=12, . . . , 15

$$\begin{pmatrix} X(i_1) \\ Y(i_1) \end{pmatrix}$$

may use the following four codewords: one of combinations according to column vectors of the matrix $$\begin{pmatrix} X \\ Y \end{pmatrix}$$

(formula 81) or according to column vectors of the matrix $$\begin{pmatrix} X \\ Y \end{pmatrix}$$

(formula 81) and the column vectors $[1 \ j \ 1 \ -j]^T$, $[1 \ -j \ 1 \ j]^T$; for example, $$\begin{pmatrix} 1 & 1 & 1 & 1 \\ 1 & -1 & 1 & -1 \\ 1 & 1 & -1 & 1 \\ 1 & 1 & 1 & -1 \end{pmatrix} \begin{pmatrix} 1 & 1 & 1 & 1 \\ j & -j & j & -j \\ 1 & 1 & 1 & 1 \\ j & -j & -j & j \end{pmatrix} \begin{pmatrix} 1 & 1 & 1 & 1 \\ \frac{1+j}{\sqrt{2}} & \frac{-1+j}{\sqrt{2}} & \frac{-1-j}{\sqrt{2}} & \frac{1-j}{\sqrt{2}} \\ j & -j & j & -j \\ \frac{-1+j}{\sqrt{2}} & \frac{1+j}{\sqrt{2}} & \frac{1-j}{\sqrt{2}} & \frac{-1-j}{\sqrt{2}} \end{pmatrix} \begin{pmatrix} 1 & 1 & 1 & 1 \\ 1 & 1 & \frac{-1+j}{\sqrt{2}} & j \\ 1 & -1 & -j & 1 \\ 1 & 1 & \frac{1+j}{\sqrt{2}} & -j \end{pmatrix};$$

the above four codewords are one of cases of the combinations of 12 column vectors, and other cases shall not be enumerated herein any further;

example 4: a set to which the codewords correspond is (8,6,2);

wherein, (8,6,2) corresponds respectively to the three types of antenna configurations, and former 14 codewords of $W_1$ ($i_1=0, \ldots, 13$) are formed by combining the codewords shown in formulae (87)-(90) (or (91)-(94)) and formulae (13)-(16);

when $i_1=14,15$, $$\begin{pmatrix} X(i_1) \\ Y(i_1) \end{pmatrix}$$

may use the following two codewords: one of combinations of 8 columns vectors according to column vectors of the matrix $$\begin{pmatrix} X \\ Y \end{pmatrix}$$

or according to column vectors of the matrix $$\begin{pmatrix} X \\ Y \end{pmatrix}$$

and the column vectors $[1 \ j \ 1 \ -j]^T$, $[1 \ -j \ 1 \ j]^T$; example, $$\begin{pmatrix} 1 & 1 & 1 & 1 \\ 1 & -1 & 1 & -1 \\ 1 & 1 & -1 & 1 \\ 1 & 1 & 1 & -1 \end{pmatrix} \begin{pmatrix} 1 & 1 & 1 & 1 \\ j & -j & j & -j \\ 1 & 1 & 1 & 1 \\ j & -j & -j & j \end{pmatrix}.$$

the above two codewords are one of cases of the combinations of 8 of 12 column vectors, and other cases shall not be enumerated herein any further.

When the rank equals to 2, it is similar to the case when the rank is 1, and when $W_1$ of the wideband use 4 bits for feedback, 16 codewords are contained. In order to simultaneously support the cross-polarized antenna configuration with a spacing of 0.5λ, co-polarized antenna configuration with a spacing of 0.5λ and the antenna configuration with a spacing of 4λ, (16,0,0), (8,8,0), codewords, and (8,4,4) codewords, etc., may be determined respectively for the above three types of antenna configurations according to priorities of them or other principles. Following description is given to the cases of (8,8,0) codewords and (8,4,4) codewords.

Example 1: taking (8,8,0) codewords as an example, the codewords of $W_1$ are formed by combining the codewords shown in formulae (87)-(90) (or (91)-(94)) and formulae (37)-(48) (or in formulae (49)-(60)).

Example 2: taking (8,4,4) codewords as an example, the former 12 codewords of $W_1$ ($i_1=0, \ldots, 11$) are formed by combining the codewords shown in formulae (87)-(90) (or (91)-(94)) and formulae (29)-(36);

when $i_1=12, \ldots, 15$, $$\begin{pmatrix} X(i_1) \\ Y(i_1) \end{pmatrix}$$

may use the following four codewords: one of combinations according to column vectors of the matrix $$\begin{pmatrix} X \\ Y \end{pmatrix}$$

or according to column vectors of the matrix $$\begin{pmatrix} X \\ Y \end{pmatrix}$$

and the column vectors $[1 \ j \ 1 \ -j]^T$, $[1 \ -j \ 1 \ j]^T$; for example, $$\begin{pmatrix} 1 & 1 & 1 & 1 \\ 1 & -1 & 1 & -1 \\ 1 & 1 & 1 & 1 \\ 1 & -1 & -1 & 1 \end{pmatrix} \begin{pmatrix} 1 & 1 & 1 & 1 \\ \frac{1+j}{\sqrt{2}} & \frac{j-1}{\sqrt{2}} & \frac{-1-j}{\sqrt{2}} & \frac{1-j}{\sqrt{2}} \\ j & -j & j & -j \\ \frac{j-1}{\sqrt{2}} & \frac{1+j}{\sqrt{2}} & \frac{1-j}{\sqrt{2}} & \frac{-1-j}{\sqrt{2}} \end{pmatrix}$$

-continued $$\begin{pmatrix} 1 & 1 & 1 & 1 \\ j & -j & 1 & -1 \\ 1 & 1 & 1 & 1 \\ j & -j & -1 & 1 \end{pmatrix} \begin{pmatrix} 1 & 1 & 1 & 1 \\ 1 & -1 & \frac{1+j}{\sqrt{2}} & \frac{-1-j}{\sqrt{2}} \\ 1 & 1 & j & j \\ -1 & 1 & \frac{-1+j}{\sqrt{2}} & \frac{1-j}{\sqrt{2}} \end{pmatrix},$$

the above four codewords are only one of cases of the combinations of 12 column vectors in the antenna configuration with a spacing of 4λ, and other cases shall not be enumerated herein any further.

It can be seen from the above embodiment that scenarios of various antenna configurations may be supported by providing codewords in the second codebook in the differential dual codebook or in the first codebook in the GoB dual codebook, thereby solving the problems in the prior art.

Embodiment 7

This embodiment is used for precoding of a GoB dual codebook, the GoB dual codebook including a first codebook for long-term and/or wideband feedback and a second codebook for instantaneous and/or subband feedback.

Figure 4:
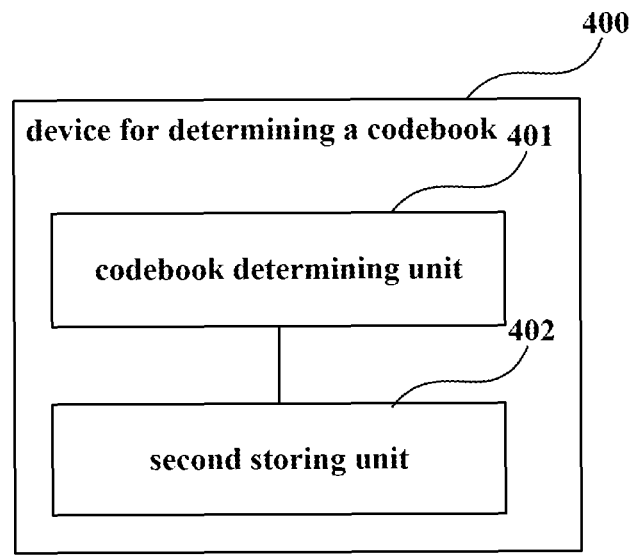
FIG. 4 is a schematic diagram of a structure of a device for determining a codebook of Embodiment 7 of the present disclosure.

FIG. 4 is a schematic diagram of a structure of a device for determining a codebook of Embodiment 7 of the present disclosure. As shown in FIG. 7, the device 400 includes: a codebook determining unit 401 configured to determine codewords in the first codebook as:

$$W_1 = \begin{pmatrix} X & 0 \\ 0 & Y \end{pmatrix} = \begin{pmatrix} X & 0 \\ 0 & D_1 X D_2 \end{pmatrix};$$

where, $D_1$ and $D_2$ are respectively unitary diagonal matrixes for respectively weighting elements at each row and each column of a matrix X, X containing $N_b$ column vectors, and $N_b$ denotes the number of beams contained in the codewords of the first codebook.

In this embodiment, the codewords of the first codebook may simultaneously support one or more types of antenna configurations. Wherein, for each type of antenna configuration, the codebook determining unit 401 may determine respective codewords.

For example, there are M types of antenna configurations, the number of codewords in the first codebook is N2, the N2 codewords simultaneously corresponding to the M types of antenna configurations; wherein, corresponding to an i-th type of antenna configuration, the number of codewords is $N_i$, $$\sum_{i=1}^{M} N_i = N_2,$$

i=1~M, where, N2 and M are positive integers, and $N_i$ is an integer greater than or equal to 0. And the codebook determining unit 401 may determine respective codewords $N_i$.

In this embodiment, the antenna configuration(s) include(s) one or more types of the following: co-polarized antenna configuration with a spacing of 0.5λ, cross-polarized antenna configuration with a spacing of 0.5λ, and cross-polarized and co-polarized antenna configuration with a spacing of 4λ or more. However, it is not limited thereto, and other existing antenna configurations may also be included.

For example, the antenna configurations include co-polarized antenna configuration with a spacing of 0.5λ, cross-polarized antenna configuration with a spacing of 0.5λ, and antenna configuration with a spacing of 4λ, that is, M=3; the number of the codewords of the first codebook is 16, that is, N2=16; in an order of the cross-polarized antenna configuration with a spacing of 0.5λ, the co-polarized antenna configuration with a spacing of 0.5λ and the antenna configuration with a spacing of 4λ, the numbers of the codewords corresponding to each type of antenna configuration are ($N_1$, $N_2$, $N_3$), respectively, for example, sets to which the 16 codewords of the first codebook correspond respectively may be (16,0,0), (8,8,0), (8,6,2) or (8,4,4). It can be seen from the above sets that for (16,0,0), the 16 codewords correspond to the cross-polarized antenna configuration with a spacing of 0.5λ; for (8,8,0), 8 codewords correspond to the cross-polarized antenna configuration with a spacing of 0.5λ and 8 codewords correspond to the co-polarized antenna configuration with a spacing of 0.5λ; for (8,6,2), 8 codewords correspond to the cross-polarized antenna configuration with a spacing of 0.5λ, 6 codewords correspond to the co-polarized antenna configuration with a spacing of 0.5λ and 2 codewords correspond to the antenna configuration with a spacing of 4λ; and for (8,4,4), it is similar to (8,6,2), which shall not be described herein any further.

It can be seen from the above that the codewords of the first codebook may simultaneously support one, two or three types of antenna configurations. However, it is not limited to the above sets, and other sets may also be used, which shall not be described herein any further.

In this embodiment, the first codebook may be addressed to a codebook of a rank that equals to 1 or 2. However, it is not limited to the above, and it is also applicable to cases where the rank is greater than 2. Following description is given taking that the rank equals to 1 and 2 as examples.

For each type of antenna configuration, the codewords in the first codebook are obtained by dividing complex codewords by second codewords obtained on a basis of the second codebook. Similar to Embodiment 1 and Embodiment 2, and as $W=W_1 W_2$, $W_2$ is known, and the complex codewords W are also known when the rank and the antenna configurations are determined, hence possible values of $W_1$ may derived when W and $W_2$ are known. As $W_1$ is not unique, they shall not be enumerated in this embodiment.

In this embodiment, for the antenna configuration that is the co-polarized antenna configuration with a spacing of 0.5λ, a certain column in a matrix $$\begin{pmatrix} X \\ Y \end{pmatrix}$$

has a structure of $[1\ e^{j\theta}\ \beta e^{j2\theta}\ \beta e^{j3\theta}]^T$; where, β is a reciprocal of a phase weighting factor α in the codewords of the second codebook, with a value range of ±1, ±j.

In this case, the codebook determining unit 401 forms the codewords of the first codebook on a basis of column vectors of the matrix $$\begin{pmatrix} X \\ Y \end{pmatrix};$$

and the codebook determining unit 401 includes: a first determining unit and/or a second determining unit; wherein, the first determining unit is configured to select a corresponding number of column vectors from a set of column vectors constituting the matrix $$\begin{pmatrix} X \\ Y \end{pmatrix}$$

to form the codewords of the first codebook in a case of transmission of a single data stream, the corresponding number being $N_b$;

the second determining unit is configured to divide the set of column vectors constituting the matrix $$\begin{pmatrix} X \\ Y \end{pmatrix}$$

into $N_b$ groups, and form the codewords of the first codebook by dividing the groups in a predetermined manner, in a case of transmission of more than one data streams.

When the rank equals to 1, the codebook determining unit 401 provides 4, 6, 8 or 16 codewords in the first codebook, and when the rank equals to 2, the codebook determining unit 401 provides 4, 8 or 16 codewords in the first codebook.

A particular embodiment of the co-polarized antenna configuration with a spacing of 0.5λ is as described in Embodiment 4, and shall not be described herein any further.

In this embodiment, the antenna configuration is the antenna configuration with a spacing of 4λ;

when the rank equals to 1, a certain column in the matrix $$\begin{pmatrix} X \\ Y \end{pmatrix}$$

has a structure of $$\begin{pmatrix} X \\ Y \end{pmatrix}_t \in \left\{ \begin{bmatrix} 1 \\ 1 \\ 1 \\ 1 \end{bmatrix}, \begin{bmatrix} 1 \\ -1 \\ 1 \\ 1 \end{bmatrix}, \begin{bmatrix} 1 \\ 1 \\ -1 \\ 1 \end{bmatrix}, \begin{bmatrix} 1 \\ -1 \\ 1 \\ -1 \end{bmatrix}, \begin{bmatrix} 1 \\ j \\ 1 \\ j \end{bmatrix}, \begin{bmatrix} 1 \\ -j \\ 1 \\ -j \end{bmatrix}, \begin{bmatrix} 1 \\ \frac{1+j}{\sqrt{2}} \\ j \\ \frac{-1+j}{\sqrt{2}} \end{bmatrix}, \begin{bmatrix} 1 \\ \frac{-1+j}{\sqrt{2}} \\ -j \\ \frac{1+j}{\sqrt{2}} \end{bmatrix}, \begin{bmatrix} 1 \\ \frac{-1-j}{\sqrt{2}} \\ j \\ \frac{1-j}{\sqrt{2}} \end{bmatrix}, \begin{bmatrix} 1 \\ \frac{1-j}{\sqrt{2}} \\ -j \\ \frac{-1-j}{\sqrt{2}} \end{bmatrix} \right\};$$

when the rank equals to 2, a certain column in the matrix $$\begin{pmatrix} X \\ Y \end{pmatrix}$$

has a structure of $$\begin{pmatrix} X \\ Y \end{pmatrix} \in \left[ \begin{pmatrix} 1 & 1 & 1 & 1 \\ 1 & -1 & 1 & -1 \\ 1 & 1 & 1 & 1 \\ 1 & -1 & -1 & 1 \end{pmatrix} \begin{pmatrix} 1 & 1 & 1 & 1 \\ \frac{1+j}{\sqrt{2}} & \frac{j-1}{\sqrt{2}} & \frac{-1-j}{\sqrt{2}} & \frac{1-j}{\sqrt{2}} \\ j & -j & j & -j \\ \frac{j-1}{\sqrt{2}} & \frac{1+j}{\sqrt{2}} & \frac{1-j}{\sqrt{2}} & \frac{-1-j}{\sqrt{2}} \end{pmatrix} \right.$$

-continued $$\left. \begin{pmatrix} 1 & 1 & 1 & 1 \\ j & -j & -1 & 1 \\ 1 & 1 & 1 & 1 \\ j & -j & -1 & 1 \end{pmatrix} \begin{pmatrix} 1 & 1 & 1 & 1 \\ 1 & -1 & \frac{1+j}{\sqrt{2}} & \frac{-1-j}{\sqrt{2}} \\ 1 & 1 & j & j \\ -1 & 1 & \frac{-1+j}{\sqrt{2}} & \frac{1-j}{\sqrt{2}} \end{pmatrix} \right];$$

and the codebook determining unit 401 includes a third determining unit and/or a fourth determining unit; wherein, the third determining unit is configured to form the codewords of the first codebook according to a set constituted by column vectors of a matrix $$\begin{pmatrix} X \\ Y \end{pmatrix};$$

and the fourth determining unit is configured to form the codewords of the first codebook according to a set constituted by column vectors of a matrix $$\begin{pmatrix} X \\ Y \end{pmatrix}$$

and column vectors $[1 \; j \; 1 \; -j]^T$, $[1 \; -j \; 1 \; j]^T$.

A particular embodiment of the co-polarized antenna configuration with a spacing of 4λ is as described in Embodiment 5, and shall not be described herein any further.

In this embodiment, for example, the antenna configuration includes the cross-polarized antenna configuration with a spacing of 0.5λ, the co-polarized antenna configuration with a spacing of 0.5λ, and the antenna configuration with a spacing of 4λ;

and the codebook determining unit 401 provides 16 codewords in the first codebook, numbers of the codewords corresponding to each type of the antenna configuration being respectively ($N_1$, $N_2$, $N_3$);

when the rank equals to 1, ($N_1$, $N_2$, $N_3$) is (16, 0, 0), (8, 8, 0), (8, 6, 2) or (8, 4, 4); and when the rank equals to 2, ($N_1$, $N_2$, $N_3$) is (16, 0, 0), (8, 8, 0) or (8, 4, 4).

In the above case, the particularly configured codewords of the first codebook are as described in Embodiment 6, and shall not be described herein any further.

Embodiment 8

Figure 5:
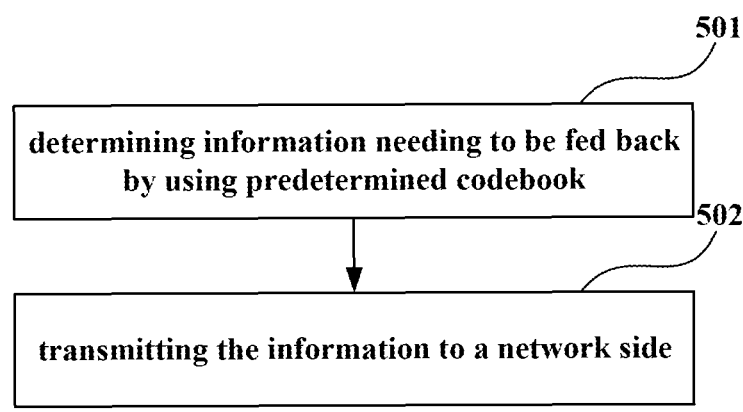
FIG. 5 is a flowchart of an information feedback method of Embodiment 8 of the present disclosure.

FIG. 5 is a flowchart of an information feedback method of Embodiment 8 of the present disclosure. As shown in FIG. 5, the method includes:

step 501: determining, by user equipment, information needed to be fed back, by using predetermined codebook;

wherein the information needed to be fed back includes a rank index and a precoding matrix, or includes a codebook index; and step 502: transmitting the information to a network side.

In this embodiment, in step 501, when the rank equals to 2 and antenna configuration is the co-polarized antenna configuration of 0.5λ, in determining the information needed to be fed back by the user equipment, the user equipment selects a precoding matrix index of a second codebook from a combination of the second codebook used by orthogonal beams contained in codewords W1 of a first codebook, when it is detected that the codewords of the first codebook use 4 codewords, 8 codewords or 16 codewords (as described in Embodiment 4).

For example, for those as described in Embodiment 4, only part of the codewords in $W_2$ need to use, such as a combination of $(m,n)\in\{(2,3),(1,4)\}$, that is, if it is detected in implementation that related codewords in embodiment 1-4 are employed in $W_1$, the PMIs of $W_2$ may only be selected from related combinations of $(m,n)\in\{(2,3),(1,4)\}$.

In this embodiment, the predetermined codebook may be determined by using the methods described in embodiments 1-6, and shall not be described herein any further. Furthermore, a process of determining the feedback information according to the predetermined codebook may use any existing technique, and shall not be described herein any further.

Embodiment 9

Figure 6:
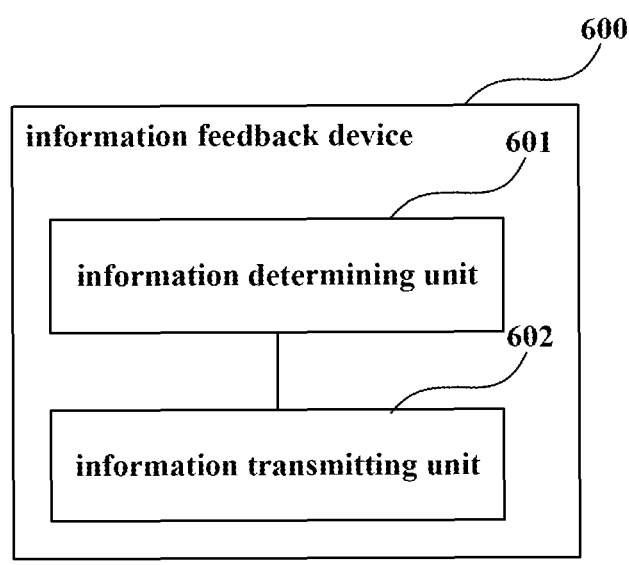
FIG. 6 is a schematic diagram of a structure of an information feedback device of Embodiment 9 of the present disclosure.

FIG. 6 is a schematic diagram of a structure of an information feedback device of Embodiment 9 of the present disclosure. As shown in FIG. 6 the device 600 includes: an information determining unit 601 and an information transmitting unit 602; wherein, the information determining unit 601 is configured to determine information needed to be fed back by using predetermined codebook; wherein the information needed to be fed back includes a rank index and a precoding matrix, or includes a codebook index, and the information determining unit includes the device as described in Embodiment 2 or Embodiment 7; and the information transmitting unit 602 is configured to transmit the information to a network side.

In this embodiment, when the rank equals to 2 and antenna configuration is the co-polarized antenna configuration of 0.5λ, in determining the information needed to be fed back by the information determining unit 601, the information determining unit 601 selects a precoding matrix index of a second codebook from a combination of the second codebook used by orthogonal beams contained in codewords W1 of a first codebook, when it is detected that the codewords of the first codebook use 4 codewords, 8 codewords or 16 codewords (as described in Embodiment 4).

For example, for those as described in Embodiment 4, only part of the codewords in $W_2$ need to use, such as a combination of $(m,n)\in\{(2,3),(1,4)\}$, that is, if it is detected in implementation that related codewords in embodiment 1-4 are employed in $W_1$, the PMIs of $W_2$ may only be selected from related combinations of $(m,n)\in\{(2,3),(1,4)\}$.

Embodiment 10

Embodiment 10 of the present disclosure further provides user equipment, including the information feedback device of Embodiment 9.

Embodiment 11

Embodiment 11 of the present disclosure further provides a communication system, including the user equipment as described in Embodiment 10. Furthermore, the communication system includes a base station configured to receive information fed back by the user equipment, so as to adjust a precoding matrix used by the base station based on the information.

An embodiment of the present disclosure further provides a computer-readable program, wherein when the program is executed in a device for determining a codebook, the program enables a computer to carry out the method for determining a codebook as described in embodiments 1 and 3-6 in the device for determining a codebook.

An embodiment of the present disclosure further provides a storage medium in which a computer-readable program is stored, wherein the computer-readable program enables a computer to carry out the method for determining a codebook as described in embodiments 1 and 3-6 in a device for determining a codebook.

An embodiment of the present disclosure further provides a computer-readable program, wherein when the program is executed in an information feedback device or user equipment, the program enables a computer to carry out the information feedback method as described in Embodiment 8 in the information feedback device or the user equipment.

An embodiment of the present disclosure further provides a storage medium in which a computer-readable program is stored, wherein the computer-readable program enables a computer to carry out the information feedback method as described in Embodiment 8 in an information feedback device or user equipment.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

What is claimed is:

1. A method for determining a codebook, for use in precoding of a Grid of Beam (GoB) dual codebook that includes a first codebook for long-term and/or wideband feedback and a second codebook for instantaneous and/or subband feedback; the method comprising:

codewords in the first codebook being:

$$W_1 = \begin{pmatrix} X & 0 \\ 0 & Y \end{pmatrix} = \begin{pmatrix} X & 0 \\ 0 & D_1 X D_2 \end{pmatrix};$$

where, $D_1$ and $D_2$ are respectively unitary diagonal matrixes for respectively weighting elements at each row and each column of a matrix X, X containing $N_b$ column vectors, $N_b$ denoting a number of beams contained in the codewords of the first codebook, $N_b>1$.

2. The method according to claim 1, wherein when there are M types of antenna configurations, the number of codewords in the first codebook is N2, the N2 codewords simultaneously corresponding to the M types of antenna configurations; wherein, corresponding to an i-th type of antenna configuration, the number of codewords is $N_i$, $$\sum_{i=1}^{M} N_i = N2,$$

i=1~M, where, N2 and M are positive integers, and $N_i$ is an integer greater than or equal to 0.

3. A device for determining a codebook, for use in precoding of a Grid of Beam (GoB) dual codebook that includes a first codebook for long-term and/or wideband feedback and a second codebook for instantaneous and/or subband feedback; the device comprising:
a memory that stores a plurality of instructions; and
a processor coupled to the memory and configured to execute the instructions to:
determine codewords in the first codebook as:

$$W_1 = \begin{pmatrix} X & 0 \\ 0 & Y \end{pmatrix} = \begin{pmatrix} X & 0 \\ 0 & D_1 X D_2 \end{pmatrix};$$

where, $D_1$ and $D_2$ are respectively unitary diagonal matrixes for respectively weighting elements at each row and each column of a matrix X, X containing $N_b$ column vectors, and $N_b$ denotes a number of beams contained in the codewords of the first codebook, $N_b>1$.

4. The device according to claim 3, wherein when there are M types of antenna configurations, the number of codewords in the first codebook is N2, the N2 codewords simultaneously corresponding to the M types of antenna configurations, wherein, corresponding to an i-th antenna configuration, the number of codewords is $N_i$, $$\sum_{i=1}^{M} N_i = N2,$$

i=1~M, where N2 and M are positive 1=1 integers, and $N_i$ is an integer greater than or equal to 0.

5. The device according to claim 4, wherein the M antenna configurations comprise cross-polarized antenna configuration with a spacing of 0.5λ, co-polarized antenna configuration with a spacing of 0.5λ, and antenna configuration with a spacing of 4λ;
and the codebook determining unit provides 16 codewords in the first codebook, numbers of the codewords corresponding to each type of the antenna configuration being respectively ($N_1$, $N_2$, $N_3$);
when a rank equals to 1, ($N_1$, $N_2$, $N_3$) is (16, 0, 0), (8, 8, 0), (8, 6, 2) or (8, 4, 4);
and when a rank equals to 2, ($N_1$, $N_2$, $N_3$) is (8, 8, 0), (16, 0, 0) or (8, 4, 4).

6. The device according to claim 3, wherein antenna configuration(s) comprise(s) one or more types of the following: co-polarized antenna configuration with a spacing of 0.5λ, cross-polarized antenna configuration with a spacing of 0.5λ, and antenna configuration and horizontally polarized antenna configuration with a spacing of 4λ or more, wherein, λ denotes wavelength, λ=c/f.

7. The device according to claim 6, wherein for each type of antenna configuration, the processor is further configured to obtain the codewords in the first codebook by dividing complex codewords by second codewords obtained on a basis of the second codebook.

8. The device according to claim 6, wherein the antenna configuration is co-polarized antenna configuration with a spacing of 0.5λ, and a certain column in a matrix $$\begin{pmatrix} X \\ Y \end{pmatrix}$$

has a structure of $[1 \ e^{j\theta} \ e^{j2\theta} \ e^{j3\theta}]^T$;
where, β is a reciprocal of a phase weighting factor α in codewords of the second codebook, with a value range of ±1, ±j.

9. The device according to claim 8, wherein the processor is further configured to:
form the codewords of the first codebook on a basis of column vectors of the matrix $$\begin{pmatrix} X \\ Y \end{pmatrix};$$

select a corresponding number of column vectors from a set of column vectors constituting the matrix $$\begin{pmatrix} X \\ Y \end{pmatrix}$$

to form the codewords of the first codebook in a case of transmission of a single data stream, the corresponding number being $N_b$; and
divide the set of column vectors constituting the matrix $$\begin{pmatrix} X \\ Y \end{pmatrix}$$

into $N_b$ groups, and form the codewords of the first codebook by dividing the groups in a predetermined manner, in a case of transmission of more than one data streams.

10. The device according to claim 6, wherein the antenna configuration is antenna configuration with a spacing of 4λ;
when the rank equals to 1, a certain column in a matrix $$\begin{pmatrix} X \\ Y \end{pmatrix}$$

has a structure of $$\binom{X}{Y}_i \in \left\{ \begin{bmatrix} 1\\1\\1\\1 \end{bmatrix}, \begin{bmatrix} 1\\-1\\1\\1 \end{bmatrix}, \begin{bmatrix} 1\\1\\-1\\1 \end{bmatrix}, \begin{bmatrix} 1\\-1\\1\\-1 \end{bmatrix}, \begin{bmatrix} 1\\j\\1\\j \end{bmatrix}, \right.$$

$$\left. \begin{bmatrix} 1\\-j\\1\\-j \end{bmatrix}, \begin{bmatrix} 1\\\frac{1+j}{\sqrt{2}}\\j\\\frac{-1+j}{\sqrt{2}} \end{bmatrix}, \begin{bmatrix} 1\\\frac{-1+j}{\sqrt{2}}\\-j\\\frac{1+j}{\sqrt{2}} \end{bmatrix}, \begin{bmatrix} 1\\\frac{-1-j}{\sqrt{2}}\\j\\\frac{1-j}{\sqrt{2}} \end{bmatrix}, \begin{bmatrix} 1\\\frac{1-j}{\sqrt{2}}\\-j\\\frac{-1-j}{\sqrt{2}} \end{bmatrix} \right\};$$

when the rank equals to 2, a certain column in a matrix $$\binom{X}{Y}$$

has a structure of $$\binom{X}{Y} \in \left[ \begin{pmatrix} 1 & 1 & 1 & 1\\ 1 & -1 & 1 & -1\\ 1 & 1 & 1 & 1\\ 1 & -1 & -1 & 1 \end{pmatrix} \begin{pmatrix} 1 & 1 & 1 & 1\\ \frac{1+j}{\sqrt{2}} & \frac{j-1}{\sqrt{2}} & \frac{-1-j}{\sqrt{2}} & \frac{1-j}{\sqrt{2}}\\ j & -j & j & -j\\ \frac{j-1}{\sqrt{2}} & \frac{1+j}{\sqrt{2}} & \frac{1-j}{\sqrt{2}} & \frac{-1-j}{\sqrt{2}} \end{pmatrix} \right.$$

$$\left. \begin{pmatrix} 1 & 1 & 1 & 1\\ j & -j & 1 & -1\\ 1 & 1 & 1 & 1\\ j & -j & -1 & 1 \end{pmatrix} \begin{pmatrix} 1 & 1 & 1 & 1\\ 1 & -1 & \frac{1+j}{\sqrt{2}} & \frac{-1-j}{\sqrt{2}}\\ 1 & 1 & j & j\\ -1 & 1 & \frac{-1+j}{\sqrt{2}} & \frac{1-j}{\sqrt{2}} \end{pmatrix} \right];$$

wherein the processor is further configured to:
form the codewords of the first codebook according to a set constituted by column vectors of a matrix $$\binom{X}{Y};$$

form the codewords of the first codebook according to a set constituted by column vectors of a matrix $$\binom{X}{Y}$$

and column vectors $[1\ j\ 1\ -j]^T$, $[1\ -j\ 1\ j]^T$.

11. The device according to claim 3, wherein the first codebook is a codebook for a rank that equals to 1 or 2.

12. A communication system, comprising user equipment configured to determine information needed to be fed back by using a codebook and transmit the information to a network side, wherein the information needed to be fed back includes a rank index and a precoding matrix, or includes a codebook index;

the UE comprising a device for determining the codebook, for use in precoding of a Grid of Beam (GoB) dual codebook that includes a first codebook for long-term and/or wideband feedback and a second codebook for instantaneous and/or subband feedback; the device configure to determine codewords in the first codebook as:

$$W_1 = \begin{pmatrix} X & 0\\ 0 & Y \end{pmatrix} = \begin{pmatrix} X & 0\\ 0 & D_1 X D_2 \end{pmatrix};$$

where, $D_1$ and $D_2$ are respectively unitary diagonal matrixes for respectively weighting elements at each row and each column of a matrix X, X containing $N_b$ column vectors, and $N_b$ denotes a number of beams contained in the codewords of the first codebook, $N_b > 1$.

13. The communication system according to claim 12, further comprising a base station configured to receive information fed back by the user equipment.

* * * * *